(12) United States Patent
Tekle et al.

(10) Patent No.: US 8,880,664 B1
(45) Date of Patent: Nov. 4, 2014

(54) METHOD AND APPARATUS FOR GENERATING A NETWORK PROFILE AND DEVICE PROFILE

(75) Inventors: Solomon Tekle, San Diego, CA (US); Keith Sinclair, Brisbane (AU); Sumit Nandy, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 2647 days.

(21) Appl. No.: 10/899,531

(22) Filed: Jul. 26, 2004

(51) Int. Cl.
*G06F 15/173* (2006.01)
*H04L 12/24* (2006.01)

(52) U.S. Cl.
CPC ................................. *H04L 41/0803* (2013.01)
USPC ........................................................ 709/223

(58) Field of Classification Search
CPC .................................................. H04L 41/0803
USPC .................................... 709/223, 224
See application file for complete search history.

(56) References Cited

U.S. PATENT DOCUMENTS

| | | | | |
|---|---|---|---|---|
| 4,873,517 | A | * | 10/1989 | Baratz et al. ................... 370/236 |
| 5,161,110 | A | | 11/1992 | Dorchak |
| 5,202,985 | A | * | 4/1993 | Goyal ........................... 709/218 |
| 5,528,516 | A | | 6/1996 | Yemini et al. |
| 5,661,668 | A | | 8/1997 | Yemini et al. |
| 5,687,290 | A | | 11/1997 | Lewis |
| 5,751,914 | A | | 5/1998 | Coley et al. |
| 5,758,154 | A | | 5/1998 | Qureshi |
| 6,006,016 | A | * | 12/1999 | Faigon et al. .................... 714/48 |
| 6,014,612 | A | | 1/2000 | Larson et al. |
| 6,040,834 | A | | 3/2000 | Jain et al. |
| 6,047,279 | A | | 4/2000 | Barrack et al. |
| 6,058,112 | A | | 5/2000 | Kerstein et al. |
| 6,249,755 | B1 | | 6/2001 | Yemini et al. |
| 6,317,788 | B1 | | 11/2001 | Richardson |
| 6,351,771 | B1 | * | 2/2002 | Craddock et al. ............. 709/227 |
| 6,360,255 | B1 | | 3/2002 | McCormack et al. |
| 6,598,183 | B1 | | 7/2003 | Grieco et al. |
| 6,618,692 | B2 | | 9/2003 | Takahashi et al. |
| 6,633,833 | B2 | | 10/2003 | Sharma et al. |
| 6,662,017 | B2 | | 12/2003 | McCann et al. |
| 6,662,192 | B1 | | 12/2003 | Rebane |
| 6,668,281 | B1 | | 12/2003 | Ayyadurai |
| 6,690,788 | B1 | | 2/2004 | Bauer et al. |
| 6,701,324 | B1 | | 3/2004 | Cochran et al. |
| 6,718,337 | B1 | | 4/2004 | Klein et al. |
| 6,751,661 | B1 | | 6/2004 | Geddes |

(Continued)

OTHER PUBLICATIONS

Todd E. Marques "A Symptom-Driven Expert System forIsolating and Correcting Network Faults", IEEE Communications Magazine, Mar. 1988—vol. 26, No. 3, pp. 6-13.*

(Continued)

*Primary Examiner* — Boris Gorney
(74) *Attorney, Agent, or Firm* — Hickman Palermo Truong Becker Bingham Wong LLP

(57) ABSTRACT

A method is disclosed for generating a network profile and a device profile relating to devices in one or more networks and comprises, in one embodiment, receiving device identity information for a plurality of devices in one or more customer networks; receiving device configuration information from each of the devices in the networks; transforming the device configuration information into device feature information; creating and storing, based on the device identity information, device configuration information, and device feature information, a device profile that summarizes device details for all the devices.

27 Claims, 22 Drawing Sheets

(56) References Cited

U.S. PATENT DOCUMENTS

| | | | |
|---|---|---|---|
| 6,754,707 | B2 | 6/2004 | Richards et al. |
| 6,772,097 | B1 | 8/2004 | Kromenakar et al. |
| 6,772,178 | B2 | 8/2004 | Mandal et al. |
| 6,788,315 | B1 * | 9/2004 | Kekic et al. .................... 715/733 |
| 6,792,456 | B1 | 9/2004 | Hellerstein et al. |
| 6,952,659 | B2 | 10/2005 | King et al. |
| 7,058,860 | B2 | 6/2006 | Miller et al. |
| 7,065,566 | B2 | 6/2006 | Menard et al. |
| 7,080,141 | B1 | 7/2006 | Baekelmans et al. |
| 7,093,010 | B2 | 8/2006 | Ostrup et al. |
| 7,412,701 | B1 * | 8/2008 | Mitra ................................ 718/1 |
| 2001/0025323 | A1 | 9/2001 | Sodergren |
| 2002/0059046 | A1 | 5/2002 | Mifune et al. |
| 2002/0073195 | A1 | 6/2002 | Hellerstein et al. |
| 2002/0173997 | A1 | 11/2002 | Menard et al. |
| 2003/0009465 | A1 | 1/2003 | Brown et al. |
| 2003/0028654 | A1 * | 2/2003 | Abjanic et al. ................. 709/229 |
| 2003/0091165 | A1 * | 5/2003 | Bearden et al. ............ 379/88.08 |
| 2003/0154267 | A1 * | 8/2003 | Camacho et al. ............. 709/223 |
| 2003/0154404 | A1 * | 8/2003 | Beadles et al. ................ 713/201 |
| 2003/0179227 | A1 * | 9/2003 | Ahmad et al. ................ 345/736 |
| 2003/0204370 | A1 | 10/2003 | Yemini et al. |
| 2004/0006688 | A1 * | 1/2004 | Pike et al. ......................... 713/1 |
| 2004/0122908 | A1 | 6/2004 | Konopka et al. |
| 2004/0123091 | A1 * | 6/2004 | Das ................................... 713/2 |
| 2004/0181670 | A1 | 9/2004 | Thune et al. |
| 2005/0114494 | A1 | 5/2005 | Beck et al. |
| 2006/0116841 | A1 | 6/2006 | Baekelmans et al. |

OTHER PUBLICATIONS

Todd E. Marques "A Symptom-Driven Expert System for Isolating and Correcting Network Faults", IEEE Communications Magazine, Mar. 1988—Vol.26, No. 3, pp. 6-13.*

Anonymous, Microsoft Computer Dictionary, Microsoft Corporation Microsoft Press, 2002, p. 41.

T. Marques, "A Symptom-Driven Expert System for Isolating and Correcting Network Faults," Mar. 1988, IEEE Communications Magazine 26:3, pp. 6-13.

Dennis Drogseth, "The New Management Landscape," *Packet, Cisco Systems Users Magazine*, Third Quarter 2002, pp. 29-60.

IBM, Cisco Systems, Inc., "Adaptive Services Framework," Version 1.00, Oct. 14, 2003, pp. 1-66.

* cited by examiner

*Fig. 7A*

| IOS Software Summary | | | | |
|---|---|---|---|---|
| Release Train | Total Customer | Customer Coverage % | Total Devices | Device Coverage % |
| 11.1CA | 10 | 2.42 | 46 | 0.01 |
| 11.1CC | 20 | 4.83 | 129 | 0.03 |
| 11.1IA | 3 | 0.72 | 8 | 0.00 |
| 11.2M | 96 | 23.19 | 1640 | 0.37 |
| 11.2P | 122 | 29.47 | 1569 | 0.36 |
| 11.2WA | 2 | 0.48 | 3 | 0.00 |
| 11.3AA | 1 | 0.24 | 1 | 0.00 |
| 11.3M | 56 | 13.53 | 475 | 0.11 |
| 11.3T | 100 | 24.15 | 1450 | 0.33 |
| 11.3WA | 12 | 2.90 | 36 | 0.01 |
| 12.0DB | 1 | 0.24 | 1 | 0.00 |
| 12.0M | 245 | 59.18 | 24204 | 5.51 |
| 12.0S | 153 | 36.96 | 6974 | 1.59 |
| 12.0SC | 1 | 0.24 | 1 | 0.00 |
| 12.0SL | 1 | 0.24 | 1 | 0.00 |
| 12.0ST | 23 | 5.56 | 600 | 0.14 |
| 12.0SX | 1 | 0.24 | 4 | 0.00 |
| 12.0T | 195 | 47.10 | 4101 | 0.93 |
| 12.0W | 136 | 32.85 | 1349 | 0.31 |
| 12.0WC | 212 | 51.21 | 20683 | 4.71 |
| 12.0WX | 8 | 1.93 | 14 | 0.00 |
| 12.0XA | 3 | 0.72 | 4 | 0.00 |
| 12.0XB | 1 | 0.24 | 709 | 0.16 |
| 12.0XC | 9 | 2.17 | 110 | 0.03 |
| 12.0XE | 40 | 9.66 | 147 | 0.03 |
| 12.0XI | 1 | 0.24 | 3 | 0.00 |
| 12.0XJ | 1 | 0.24 | 2 | 0.00 |
| 12.0XK | 77 | 18.60 | 515 | 0.12 |
| 12.0XL | 1 | 0.24 | 1 | 0.00 |
| 12.0XM | 2 | 0.48 | 177 | 0.04 |
| 12.0XN | 3 | 0.72 | 9 | 0.00 |
| 12.0XQ | 2 | 0.48 | 5 | 0.00 |
| 12.1AA | 2 | 0.48 | 115 | 0.03 |
| 12.1AX | 6 | 1.45 | 15 | 0.00 |

| Hardware Summary | | | | |
|---|---|---|---|---|
| HW Family | Total Customer | Customer Coverage % | Total Devices | Device Coverage % |
| Catalyst 1100 Series Switches | 2 | 0.48 | 13 | 0.00 |
| Catalyst 1200 Series Switches | 7 | 1.69 | 11 | 0.00 |
| Catalyst 1400 Series Switches | 11 | 2.66 | 71 | 0.02 |
| Catalyst 1600 Series Switches | 1 | 0.24 | 3 | 0.00 |
| Catalyst 1900 Series Switches | 112 | 27.05 | 23164 | 5.27 |
| Catalyst 2600 Series Switches | 1 | 0.24 | 1 | 0.00 |
| Catalyst 2800 Series Switches | 26 | 6.28 | 454 | 0.10 |
| Catalyst 2900 Series LRE XL Switches | 9 | 2.17 | 45 | 0.01 |
| Catalyst 2900 Series XL Switches | 247 | 59.66 | 36054 | 8.21 |
| Catalyst 2940 Series Switches | 5 | 1.21 | 7 | 0.00 |
| Catalyst 2950 Series Switches | 208 | 50.24 | 21047 | 4.79 |
| Catalyst 3000 Router Module | 2 | 0.48 | 6 | 0.00 |
| Catalyst 3000 Series Switches | 9 | 2.17 | 33 | 0.01 |
| Catalyst 3100 Series Switches | 5 | 1.21 | 36 | 0.01 |
| Catalyst 3200 Series Switches | 1 | 0.24 | 8 | 0.00 |
| Catalyst 3500 Series XL Switches | 215 | 51.93 | 23582 | 5.37 |
| Catalyst 3550 Series Switches | 187 | 45.17 | 15910 | 3.62 |
| Catalyst 3750 Series Switches | 32 | 7.73 | 314 | 0.07 |
| Catalyst 3900 Series Switches | 33 | 7.97 | 1448 | 0.33 |
| Catalyst 4000 Router Module | 41 | 9.90 | 248 | 0.06 |
| Catalyst 4000 Series Switches | 208 | 50.24 | 10876 | 2.48 |
| Catalyst 4200 Series Switches | 3 | 0.72 | 11 | 0.00 |
| Catalyst 4500 Series Switches | 97 | 23.43 | 2404 | 0.55 |
| Catalyst 5000 Router Module | 152 | 36.71 | 2089 | 0.48 |
| Catalyst 5000 Series Switches | 149 | 35.99 | 5977 | 1.36 |
| Catalyst 5500 Series Switches | 231 | 55.80 | 17846 | 4.06 |
| Catalyst 6000 Router Module | 280 | 67.63 | 11041 | 2.51 |
| Catalyst 6000 Series Switches | 6 | 1.45 | 8 | 0.00 |
| Catalyst 6500 Series Switches | 323 | 78.02 | 30250 | 6.89 |
| Catalyst 7600 Series Switches | 3 | 0.72 | 6 | 0.00 |
| Catalyst 8500 Series Campus Switch Routers | 34 | 8.21 | 537 | 0.12 |
| Catalyst 8500 Series Multiservice | 31 | 7.49 | | |

*Fig. 9B*

| Technology/Feature Distribution Summary | | | | | |
|---|---|---|---|---|---|
| Technology | Feature | Total Customer | Customer Coverage % | Total Devices | Device Coverage % |
| ATM | AAL5SNAP Encapsulation | 205 | 49.52 | 7780 | 2.18 |
| | ATM LANE Client | 32 | 7.73 | 395 | 0.11 |
| | ATM LANE Fast Simple Server Redundancy Protocol (LANE Fast SSRP) | 1 | 0.24 | 44 | 0.01 |
| | ATM PVC Range and Routed Bridge Encapsulation Subinterface Grouping | 7 | 1.69 | 223 | 0.06 |
| | ATM PVC Trap Support | 95 | 22.95 | 2143 | 0.60 |
| | ATM Routed Bridge Encapsulation | 18 | 4.35 | 387 | 0.11 |
| | ATM SNMP Trap and OAM Enhancements | 3 | 0.72 | 7 | 0.00 |
| | ATM Sub-interface Multipoint | 101 | 24.40 | 1700 | 0.48 |
| | ATM Sub-interface Point to Point | 256 | 61.84 | 12552 | 3.51 |
| | ATM DXI | 5 | 1.21 | 14 | 0.00 |
| | ATM UNI 3.1 signaling for ATM | 63 | 15.22 | 2278 | 0.64 |
| | OAM PVC Management | 165 | 39.86 | 7634 | 2.13 |

METHOD AND APPARATUS FOR GENERATING A NETWORK PROFILE AND DEVICE PROFILE

CROSS-REFERENCE TO RELATED APPLICATIONS

This application is related to application Ser. No. 10/714,158, filed Nov. 13, 2003, the entire contents of which is hereby incorporated by reference as if fully set forth herein.

FIELD OF THE INVENTION

The present invention generally relates to management of computer networks. The invention relates more specifically to generating summary information useful in network operation and management.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Vendors of computer network equipment such as routers, switches, hubs, and other infrastructure elements may need to respond to requests from their customers for technical support. In present practice, the primary method of responding to a customer request for network support is through a face-to-face or telephone consultation with a customer support engineer. To evaluate the issue presented by the customer and determine a technical response, the responding engineer typically must perform the following tasks: request a brief description of the issue or problem; request customer network general profile information, such as what operating system version is used by customer devices, what network hardware is used by the customer, and what networking technologies and protocols the customer is using; and manually correlate the information provided by the customer to known bugs, fixes, patches, or other solutions.

The foregoing process is labor-intensive and, for a complex network, may require an extensive amount of information interchange between the responding engineer and the customer. Further, the process is workable only under limited conditions. For example, the number of network devices and configured network technologies needs to be relatively small; the correlation and analysis to be performed needs to involve analysis of relatively little information; and the responding engineer needs to have experience and apply a thorough approach. When the number of network devices is large, the complexity of performing this support process becomes impractical.

No past approach has provided a useful integrated view of attributes of a complex network or devices in such networks. In past approaches, network management systems such as Hewlett-Packard OpenView and CiscoWorks 2000/Resource Management Essentials, available from Cisco Systems, Inc., have provided flat table views or lists of device information for devices in a network. However, obtaining a rapid summary of this information, to provide an overall profile of the network, has not been provided. Further, answering detailed questions about networks has required support engineers or customer representatives to perform complicated database queries to obtain the needed information. In yet another prior approach, use of command-line interface commands such as "show <Tech Support>" has yielded a dump of a large volume of data that is difficult to correlate.

Based on the foregoing, there is a clear need for a way to generate network profile information to enable an individual to access a summary of devices, technologies, and features of a network and devices in the network.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7A is a screen display diagram showing an example network profile for a plurality of customer networks;

FIG. 9B is a screen display diagram showing an example technology/feature summary;

FIG. 10C is a screen display diagram showing an example card family distribution summary;

FIG. 12 is a screen display diagram showing an example customer/device distribution summary.

DETAILED DESCRIPTION

Figure 1:
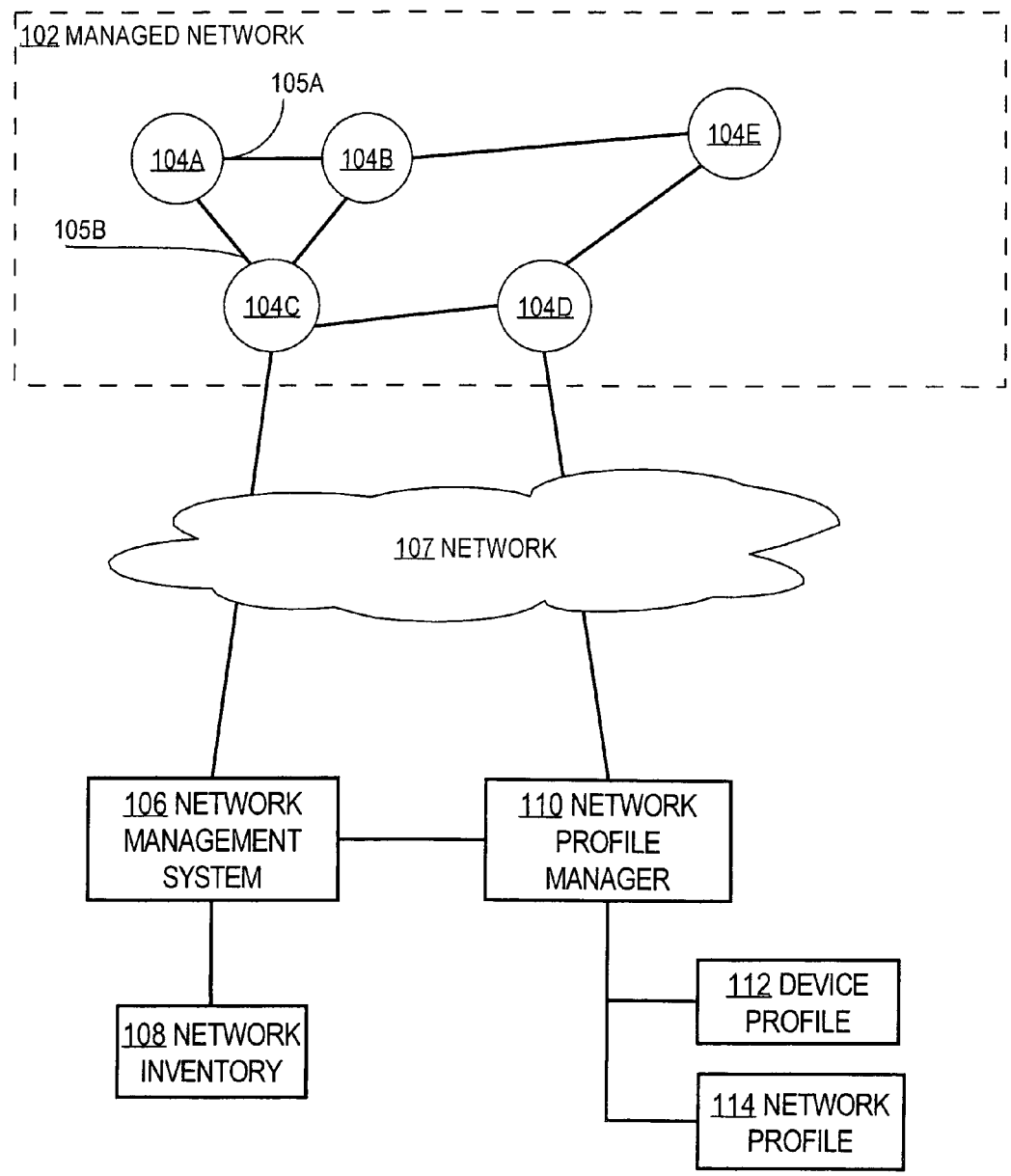
FIG. 1 is a block diagram that illustrates an overview of a system for generating a network profile and a device profile.

A method and apparatus for generating a network profile and a device profile is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
 1.0 General Overview
 2.0 Structural and Functional Overview
  2.1 Profiling in General
  2.2 System Examples
  2.3 Generating Network Profiles and Device Profiles
  2.4 Example GUI-Based Network Profile Manager
 3.0 Implementation Mechanisms—Hardware Overview
 4.0 Extensions and Alternatives 1.0 General Overview The needs identified in the foregoing Background, and other needs and objects that will become apparent for the following description, are achieved in the present invention, which comprises, in one aspect, a method for generating a network profile and a device profile relating to devices in one or more networks, comprising the steps of receiving device identity information for a plurality of devices in one or more customer networks; receiving device configuration information from each of the devices in the networks; transforming the device configuration information into device feature information; creating and storing, based on the device identity information, device configuration information, and device feature information, a device profile that summarizes device details for all the devices.

According to one feature, the method further comprises creating and storing, based on the device identity information, device configuration information, and device feature information, a network profile that summarizes the networking devices and technologies that are in use in the network. In another feature, the method further comprises receiving a sysObjID MIB variable value from each of the devices; mapping the MIB variable value to a device type value; and mapping the device type value to one or more device characteristic values. In a related feature, mapping the device type value is performed based on one or more device characteristic rules.

According to another feature, the method further comprises reading a configuration file associated with each of the devices to yield the device configuration information; and determining one or more device features represented in the configuration file by applying one or more feature rules to the device configuration information. In a related feature, the method further comprises grouping each of the one or more device features into one or more technology types as part of the device profile.

According to still another feature, creating and storing the topology profile comprises generating an in-memory model of a Layer 3 topology of the network; and based on the in-memory model, creating and storing topology summary information for each of a plurality of network topology attributes. Further, creating and storing a device profile may comprise creating and storing device summary information for each of a plurality of device details including interfaces, cards, and one or more neighboring nodes. The method may further comprise providing the device profile to a requesting process through an API.

In another feature, the network profile comprises a software summary for all software releases that are run by devices in the customer networks and a hardware summary of all hardware families associated with devices in the customer networks. In one related feature, the software summary comprises one or more release number values, wherein selecting a particular release number value causes generating a software distribution summary comprising a customer count, customer coverage percentage, device count, and device coverage percentage for all software versions that are associated with a selected release number value. In another feature, the software summary comprises one or more customer count values and release number values, wherein selecting a particular customer count value causes generating a customer summary that lists and summarizes customer information about one or more entities that use the particular release number.

The software distribution summary may comprise one or more customer count values and software version number values, wherein selecting a particular customer count value causes generating a customer summary that lists and summarizes customer information about one or more entities that use a software version of a particular software version number that is associated with the selected particular customer count value. The device profile may comprise summary information identifying device chassis type, device software version, cards, interface types, interface names, memory type, technology types, and feature types.

In one embodiment, the method further comprises generating and displaying a hardware distribution summary that lists product groups and model identifiers, and identifies a customer count, customer coverage, device count, and device coverage for all devices in the customer networks that have the listed model identifiers. The method further comprises generating and displaying a technology feature summary that lists information about networking technologies and device features associated with the networking technologies, and identifies a customer count, customer coverage, device count, and device coverage for all devices in the customer networks that have the listed device features.

In another embodiment, the method may further comprise generating and displaying a software distribution summary that lists software versions used by devices in the customer networks, and identifies a customer count, customer coverage, device count, and device coverage for all devices in the customer networks that have the listed software versions. In still another feature, the method further comprises generating and displaying a software status summary that lists software status values associated with software programs that are used by devices in the customer networks, and identifies a customer count, customer coverage, device count, and device coverage for all devices in the customer networks that have software programs with the listed software status values.

In yet another feature, the method comprises generating and displaying a software image distribution summary that lists software image values associated with software images that are used by devices in the customer networks, and identifies a customer count, customer coverage, device count, and device coverage for all devices in the customer networks that have software programs with the listed software image values. In still another feature, the method comprises generating and displaying a card distribution summary that lists card values associated with electronic circuit cards that are used by devices in the customer networks, and identifies a customer count, customer coverage, device count, and device coverage for all devices in the customer networks that have software programs with the listed electronic circuit cards.

In other aspects, the invention encompasses a computer apparatus and a computer-readable medium configured to carry out the foregoing steps.

2.0 Structural and Functional Overview

2.1 Profiling in General

A network profile manager as described herein provides the capability to analyze, summarize and condense network inventory, configuration, and performance data in a central location. The summarized information about the network is available to users or applications through a common user interface-based API for further analysis and reporting.

In one embodiment, a profile manager provides summary information for: a summary of each platform deployed in the network and count; a summary of each interface type deployed in the network and count; a summary of each module type deployed in the network and count; software version information, a summary of each version of software deployed in the network and the count for both major and maintenance releases; a summary of networking technologies that has been deployed; and software features deployed in the network.

In an embodiment, a profiling process is performed periodically and profile information is stored in a database table. The profiling process may be performed by a network equipment vendor for each of its customers, and then updated after any significant changes have been noted in the network.

The process of producing a network profile is based on profiling a single device, and then aggregating and summarizing device profile information into various groups.

In one embodiment, network topology analysis provides a classification of devices, as well as the identification of campus networks. Each device class and campus network is considered a group. Thus, a particular network device can be a member of many groups.

Device profile generation involves determining one or more profile elements that characterize a particular device; the device profile elements then are summarized into the groups. In one embodiment, device profile elements comprise: Chassis type, including major and minor types; software release identifier, including major, interim and maintenance releases; card model numbers; interface types; interface list; memory attributes; technologies; and information processing features.

Using the disclosed approaches, device profile generation and network profile generation may be integrated with a front-end application that can provide numerous functions and benefits. For example, using the disclosed system, network administrators and outside vendors can learn dynamically what the network comprises. When a network administrator can access detailed information about the equipment in the network, the administrator is expected to have more customer satisfaction, to require less trouble call case resolution time, and to have improved productivity.

In one embodiment, the approaches herein may be integrated into a customer defect tracking system. For example, by making the device profile information and network profile information available to defect tracking tools and databases, the approaches herein are able to automate the defect tracking and notification process.

Further, the approaches herein may be used by a network equipment vendor to rapidly determine whether a particular customer is entitled by contract to receive replacement parts or components. For example, the network profile manager disclosed herein may be integrated with a service contract management database and other entitlement verification systems; as a result, a vendor can proactively determine and verify that information in the vendor's systems matches customer expectations.

In another application, the information herein supports performing fractional audits via automatic expert analysis, correlation and reporting. The enhanced inventory database analysis, correlation and reporting provided herein can offer the equivalent of a fractional audit that includes reports such as: for software, operating system versions, bootstrap, reload status and exceptions; for hardware, microcode revision numbers, board revisions, and inventory and exceptions; for memory, identification of possible memory fragmentation and low water marks; deferred or recalled releases in the customer's network; engineering releases in customer's network; any other OS status releases in the customer's network; product bulletins and bugs that affect customer inventory; etc.

As used herein, a network profile is a set of information that summarizes features and characteristics of network elements and the network as a whole. In one embodiment, a network profile provides summary information that includes:

A list summarizing each hardware platform deployed in the network and a count of the number of that platform that is present in the network.

A list summarizing each interface type deployed in the network and a count.

A summary of each module type deployed in the network and a count.

A summary of each version of software deployed in the network and the count, both major and maintenance release.

A summary of each defined technology and features that have been deployed.

Software image features deployed in the network.

Further, as used herein, a device profile is a summary of information about a device. A device profile provides information about how a device has been configured and what components comprise the device. In one embodiment, a device profile comprises a list of interface types, technologies and features that have been enabled for the device.

2.2 System Examples

FIG. 1 is a block diagram that illustrates an overview of a system for generating a network profile and a device profile.

A managed network 102 comprises a plurality of interconnected network elements 104A, 104B, 104C, etc. In one embodiment, network elements 104A, 104B, 104C comprise routers, switches, or other elements of network infrastructure. A network management system 106 is coupled, directly or indirectly through one or more other networks or internetworks, to managed network 102 and provides management functions such as provisioning, configuration, inventory, etc. Network management system 106 hosts or accesses a network inventory 108, which is a repository of information describing particular devices in the managed network 102.

A network profile manager 110 is coupled, directly or indirectly, to the managed network 102. Network profile manager 110 may be integrated with network management system 106, in one embodiment. Using the techniques described herein, network profile manager 110 generates one or more device profiles 112 and network profiles 114. Additionally or alternatively, a console 115 may be coupled to a manual data interface of network profile manager 110. Through the manual data interface, network profile manager 110 can receive manually entered information, such as CLI commands, and generate network profiles 114. Network management system 106 may be, for example, CiscoWorks 2000/Resource Management Essentials (RME), commercially available from Cisco Systems.

Figure 5A:
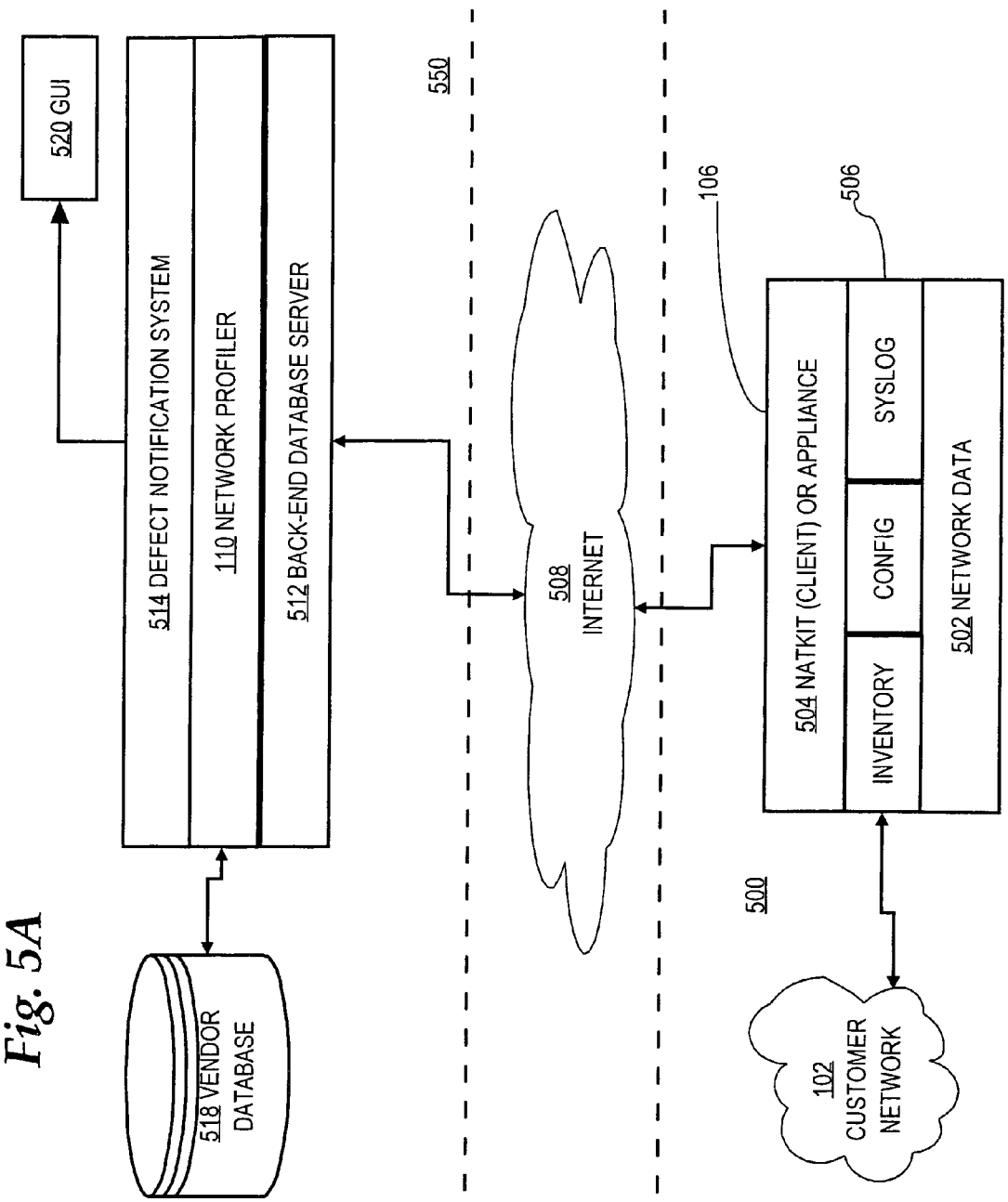
FIG. 5A is a block diagram of a device defect notification information that includes an integrated network profile manager.

FIG. 5A is a block diagram of a device defect notification information that includes an integrated network profile manager. FIG. 5A is one example of how the techniques herein may be integrated with other network management systems to provide particular functions.

At a customer premises 500, a customer network 102 is coupled to a network management system 106 that includes network data 502, network management applications 506 providing inventory, configuration, and system log functions, and a network data reporting element 504. In one embodiment, network data reporting element 504 is a NATKIT client, commercially available from Cisco Systems, Inc.

Network data reporting element 504 is communicatively coupled through Internet 508 to a back-end server system 510 comprising, in one embodiment, a back-end database server 512, network profiler application 110, and defect notification application 514. Optionally, back-end server system may host other applications that use network profiler application 110, such as a best practices application, topology application, etc. Back-end server system 510 is coupled to one or more vendor internal databases 518. For example, databases 518 comprise a defect tracking system that is maintained by a network equipment vendor. Back-end server system also provides a graphical user interface 520 so that features and functions provided by the system are accessible to users, for example, through a Web-based GUI.

Back-end database 512 may be, for example, a server element that cooperates with network data reporting element 504 to receive and store network data from the customer network 102. Back-end database 512 may form part of a NATKIT server application, for example. Thus, network data reporting element 504 can periodically report network data 502 pertaining to managed network 102 to a back-end database server 512 at a vendor location 550. The network data 502 may comprise information about the configuration, inventory, or changes occurring in customer network 102. Back-end database 512, which receives, decrypts, validates, performs entitlement checks, and stores the information.

For purposes of illustrating a simple example, FIG. 5A shows one customer network 102 and network management system 106; however, in another embodiment, network profiler application 110 may communicate with and manage any number of customer networks, each having a respective network management system 106 for collecting information about that network and providing it to the network profiler application 110. Thus, network profiler application can receive information from multiple networks of customers of a vendor that deploys the network profiler application, and consolidate and summarize the data in a central database. As a result, customer service representatives or network engineers of the vendor can rapidly view profiles that summarize devices, technologies, and features that are deployed across dozens of customer networks.

2.3 Generating Network Profiles and Device Profiles

Figure 2:
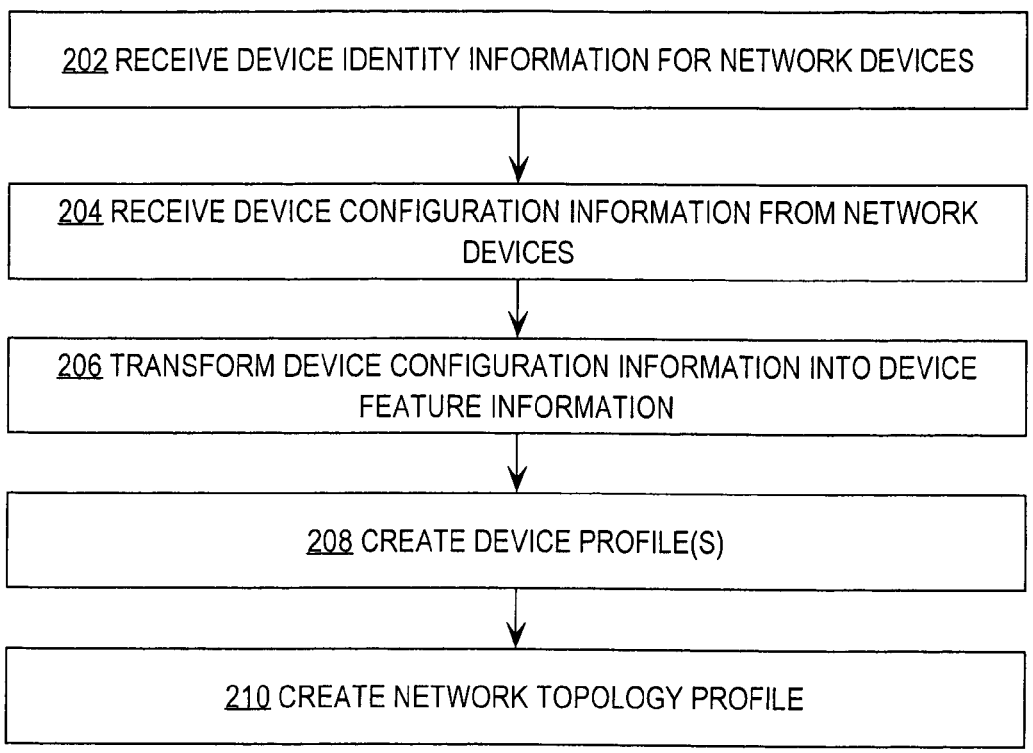
FIG. 2 is a flow diagram that illustrates a high level overview of one embodiment of a method for generating a network profile including a topology profile.
Figure 3:
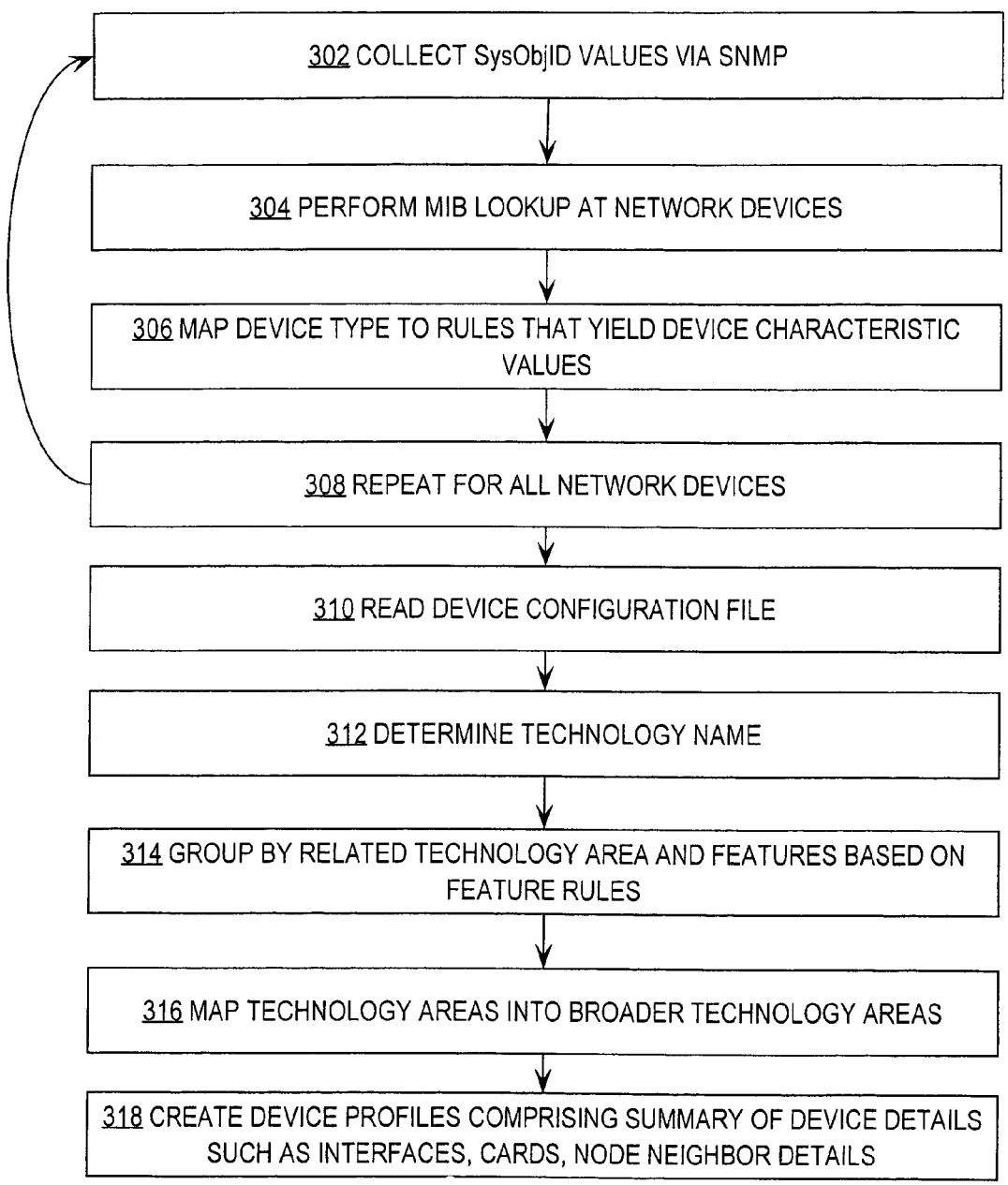
FIG. 3 is a flow diagram that illustrates one embodiment of a method for generating profile information upon which the network device profiles are based.
Figure 4:
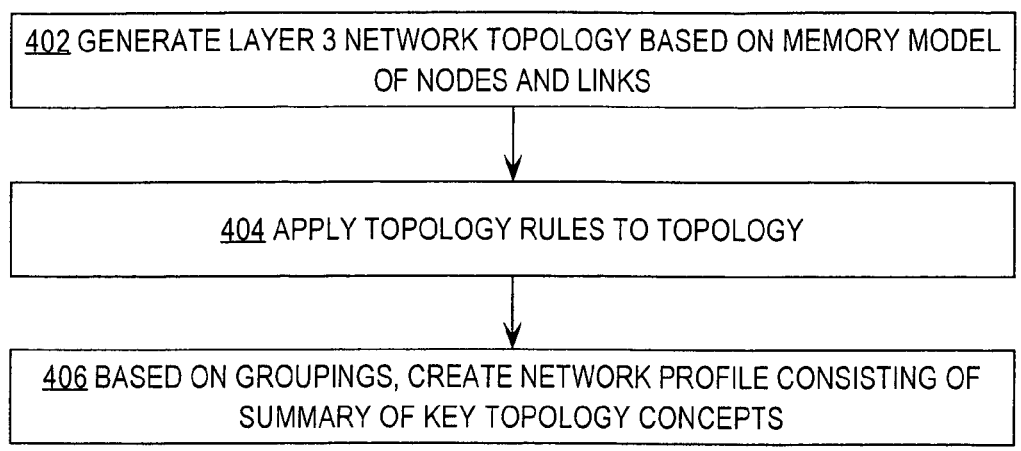
FIG. 4 is a flow diagram that illustrates one embodiment of a method for generating a topology profile.

FIG. 2 is a flow diagram that illustrates a high level overview of one embodiment of a method for generating a network profile including a topology profile; FIG. 3 is a flow diagram that illustrates one embodiment of a method for generating profile information upon which the network device profiles are based; FIG. 4 is a flow diagram that illustrates one embodiment of a method for generating a topology profile. For purposes of illustrating a clear example, the embodiments of FIG. 2, FIG. 3, FIG. 4 are described herein with reference to the system of FIG. 1. However, FIG. 1 represents only one example system implementation, and the processes of FIG. 2, FIG. 3, FIG. 4 may be practiced in or integrated with other contexts and systems.

Referring first to FIG. 2, in step 202, device identity information is received for network devices. For example, network profile manager 110 requests, from network inventory 108, information identifying each device that is known to form a part of managed network 102. The responsive information may be provided by network management system 106 after sending appropriate queries to network inventory 108. Alternatively, network profile manager 110 may access network inventory 108 directly through an API.

In step 204, device configuration information is received from network devices. For example, network profile manager 110 issues one or more SNMP GET requests to the devices of managed network 102. Since network profile manager 110 has received inventory information that identifies the devices at step 202, in step 204 the network profile manager can issue SNMP requests to each of the devices that are identified. In response, network profile manager 110 receives a copy of the running configuration from each of the devices. In an alternative embodiment, network profile manager 110 obtains equivalent device configuration information from a system database that is maintained by network management system 106.

In step 206, the device configuration information is transformed into device feature information. Transformation includes applying one or more feature rules to the device configuration information. Feature rules may be expressed according to the Rule-Based Markup Language that is described in co-pending application Ser. No. 10/714,158, filed Nov. 13, 2003, of inventors Keith Sinclair et al. (hereinafter "Sinclair et al.").

In step 208, one or more device profiles are created based on the device features. In an embodiment, device profiles are created by summarizing the device feature information.

In step 210, a network topology profile is created based on the device profiles.

Referring now to FIG. 3, a more detailed view of steps 204-208 of FIG. 2 is provided. FIG. 3 assumes that information identifying a set of network devices has been obtained previously, as in step 202 of FIG. 2. In step 302 of FIG. 3, for a particular network device, an SNMP request is issued to collect that value of the sysObjID MIB variable of the device. The value of the sysObjID MIB variable provides a unique device identifier. In step 304, a MIB table lookup is performed to map the value of the sysObjID MIB variable to a device type. For example, a mapped device type might comprise "Cisco 2600 Series Router."

In step 306, the device type is mapped to one or more rules that yield device characteristic values. The mapping of step 306 associates a device type value to a set of characteristics of all devices of that type. For example, all devices of a particular type may have a particular number of serial interfaces, whereas devices of a different type may have no serial interfaces at all. As indicated by step 308, steps 302-306 are repeated for all devices that were identified in the network at step 202 of FIG. 2.

In step 310, for a particular device, a device configuration file is read. For example, for each of the devices that was discovered using network inventory 108, the then-current running configuration is retrieved from the devices using appropriate SNMP requests. Alternatively, a copy of the running configuration is obtained from a system database of network management system 106, if available.

In step 312, one or more technology names are determined based on reading and parsing the configuration file. For example, step 312 involves applying pattern-matching rules to the configuration commands that are in the configuration file to identify one or more technologies that are represented by the configuration. For example, a set of configuration commands may pertain to establishing virtual private network (VPN) links between a first device and one or more other devices. Alternatively, another set of configuration may pertain to setting up Border Gateway Protocol (BGP) on a particular router. Applying the pattern matching rules results in determining that a particular set of configuration represents a particular technology.

In step 314, the devices and technologies are grouped by related technology area, and device features, based on applying feature rules to the discovered device information and technology information. For example, all routers running BGP are associated with a BGP group, all network elements that support SNMP are placed in another group, all devices that perform ATM switching are assigned to another group, etc. As another example, all devices that are running operating system version 11.0 are put in one group, all devices that are running version 12.0 are put in another group, etc. Step 314 may involve updating tables of a database that network profile manager 110 maintains.

In step 316, the groupings established in step 314 are mapped into broader technology areas. For example, all devices that implement any of several different kinds of secure access technologies may be placed in a Security group. Step 316 is performed with reference to a stored mapping of groups to broader technology areas. Step 316 may involve updating tables of the database of network profile manager 110.

In step 318, device profiles are created based on the groupings, technology areas and features identified in the preceding steps. In one embodiment, each device profile summarizes device details such as interfaces, cards, and node neighbors.

Referring now to FIG. 4, steps in creating a network profile are shown. In step 402, a Layer 3 network topology is generated based on a memory model of nodes and links in the network. For example, network management system 106 maintains a metadata description of managed network 102 in terms of nodes, such as network elements 104A, 104B, etc., and links 105A, 105B among the nodes. Network profile manager 110 obtains the metadata and constructs an in-memory topology model of the managed network 102.

In step 404, topology rules are applied to the topology. In step 406, based on the groupings and device profiles that were created in the process of FIG. 3, a network profile is created. In one embodiment, a network profile comprises a summary of key topology concepts that apply to the managed network.

2.4 Example GUI-Based Network Profile Manager Application

The foregoing general principles may be implemented in a software application that provides a network profile manager 110 with a graphical user interface for display of reports and for receiving user input. An example network profile manager and graphical user interface are now described.

Figure 5B:
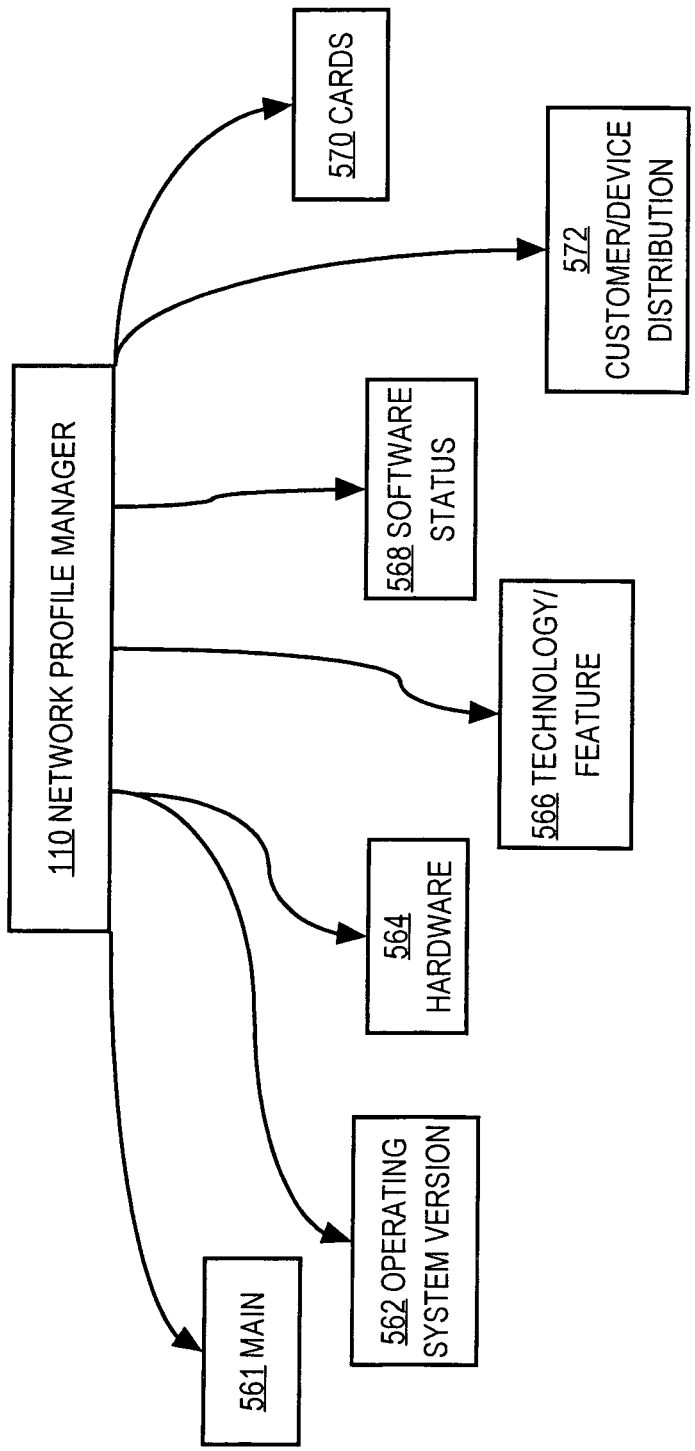
FIG. 5B is a block diagram showing functions that may be performed by a network profile manager.

FIG. 5B is a block diagram showing functions that may be performed by a network profile manager. In one embodiment, network profile manager 110 may provide a main page 561 that comprises a network profile, an operating system version summary 562, a hardware summary 564, a technology/feature summary 566, a software status summary 568, a software image summary 569, a device card summary 570, and a customer/device distribution summary 572. Each summary shown in FIG. 5B may comprise a tabular report that is displayed as part of GUI 520 (FIG. 5A).

Figure 6:
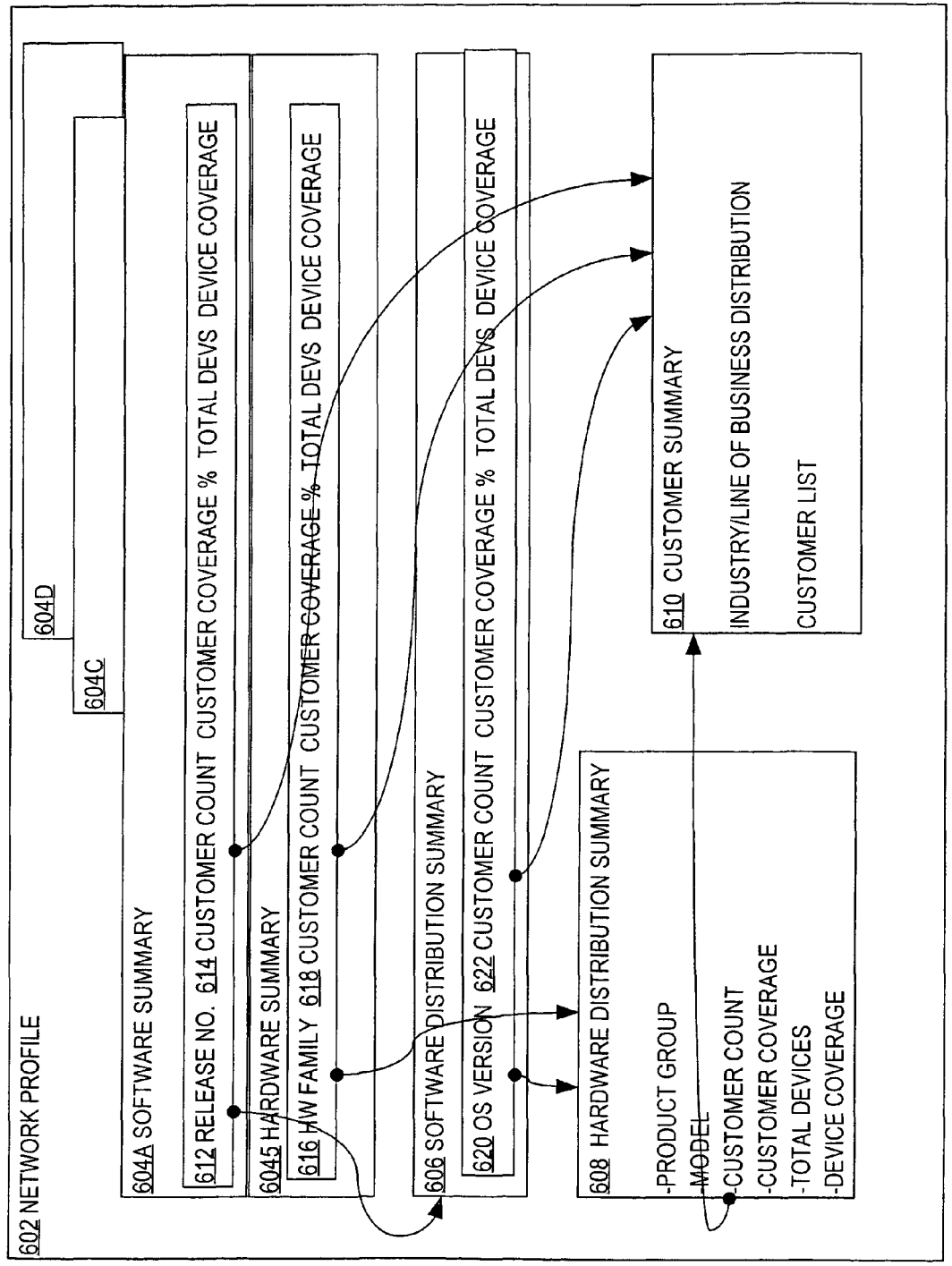
FIG. 6 is a block diagram of a network profile, summary information, and relationships among summary information that may be generated in an embodiment.

The summaries shown in FIG. 5B may be interlinked, in one embodiment, as shown in FIG. 6, which is a block diagram of a network profile and linked relationships among network and device summary information. In one embodiment, network profile manager 110 generates linked reports that present the network profile and device profile information, and also serve as a user interface to the network profile manager by providing hyperlinks that may be used to access other reports.

In the embodiment of FIG. 6, a network profile 602 as displayed using main function 561 (FIG. 5B) comprises one or more software summaries 604A, 604B, 604C, etc., and a hardware summary 605, which may be presented in a user interface as hyperlinked parts of an electronic document, such as an HTML document. Each of the software summaries 604A, 604B, 604C, etc., relates to a different family of software that is deployed in one or more customer networks. For example, software summary 604A may relate to a family of router operating system software, software summary 604B may relate to a family of firewall operating system software, etc. FIG. 7A is a screen display diagram showing an example network profile 700, in which software summary 704A and hardware summary 705 correspond to software summary 604A and hardware summary 605.

In one embodiment, each software summary 604A, 604B, 604C, etc., comprises a table or list having columns for release identifiers for software releases within the associated software family, a count of the number of customers that have any device running the specified software release, a customer coverage value indicating the percentage of all customers that have any device running the specified software release, the total number of devices in all customer networks that run the specified software release, and a device coverage value indicating the percentage of devices that are running the specified software release.

Figure 7B:
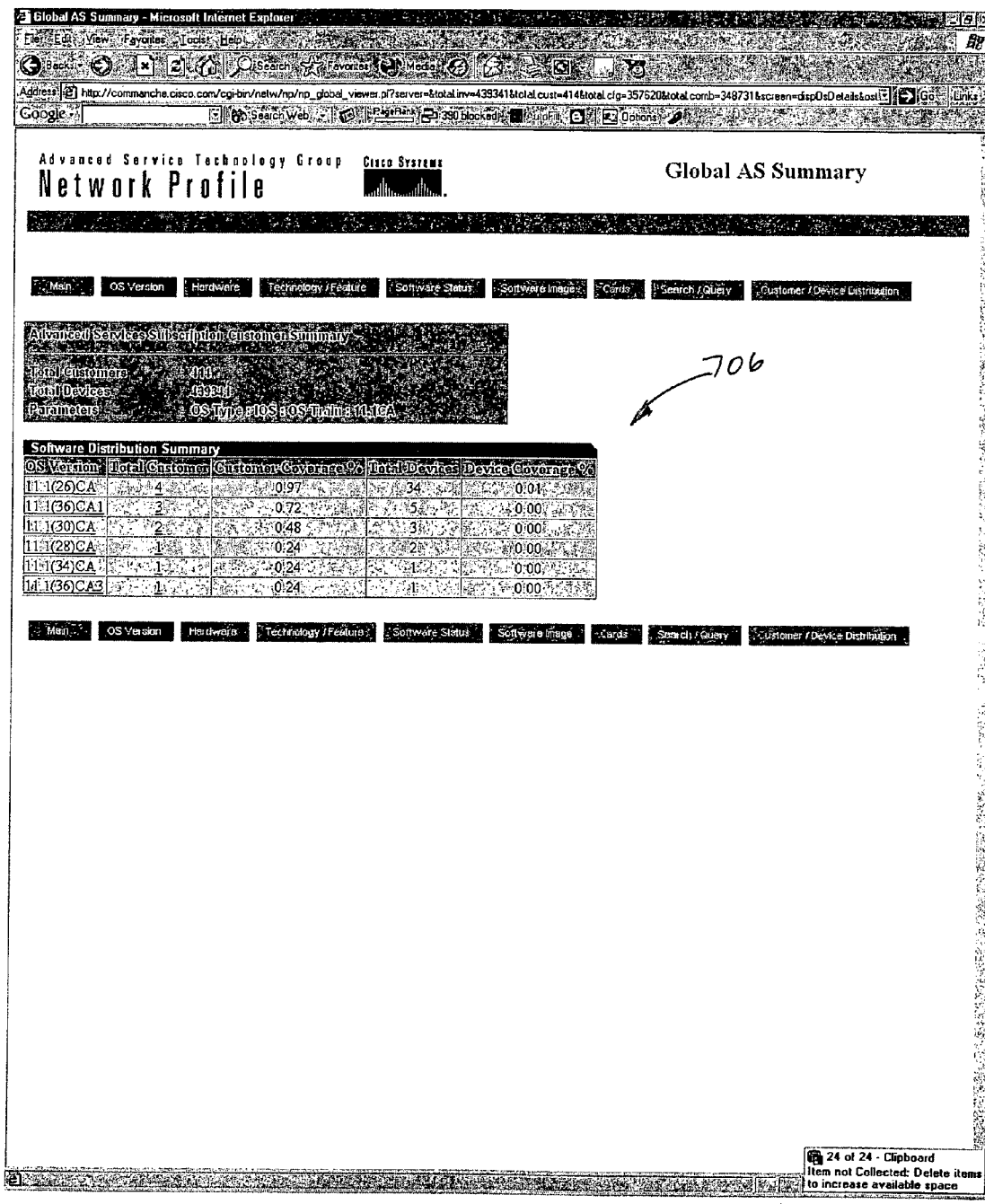
FIG. 7B is a screen display diagram showing an example software distribution summary.

Values in the release number column 612 and the customer count column 614 are hyperlinked. Selecting a release number value from column 612 causes the system to generate and display a Software Distribution Summary 606, comprising a table or list of operating system version values associated with the selected release number value, a customer count for each operating system version value, a customer coverage percentage value, a total device count value showing all devices that run the associated operating system version, and a device percentage value. FIG. 7B is a screen display diagram showing an example software distribution summary 706 corresponding to summary 606.

Figure 7C:
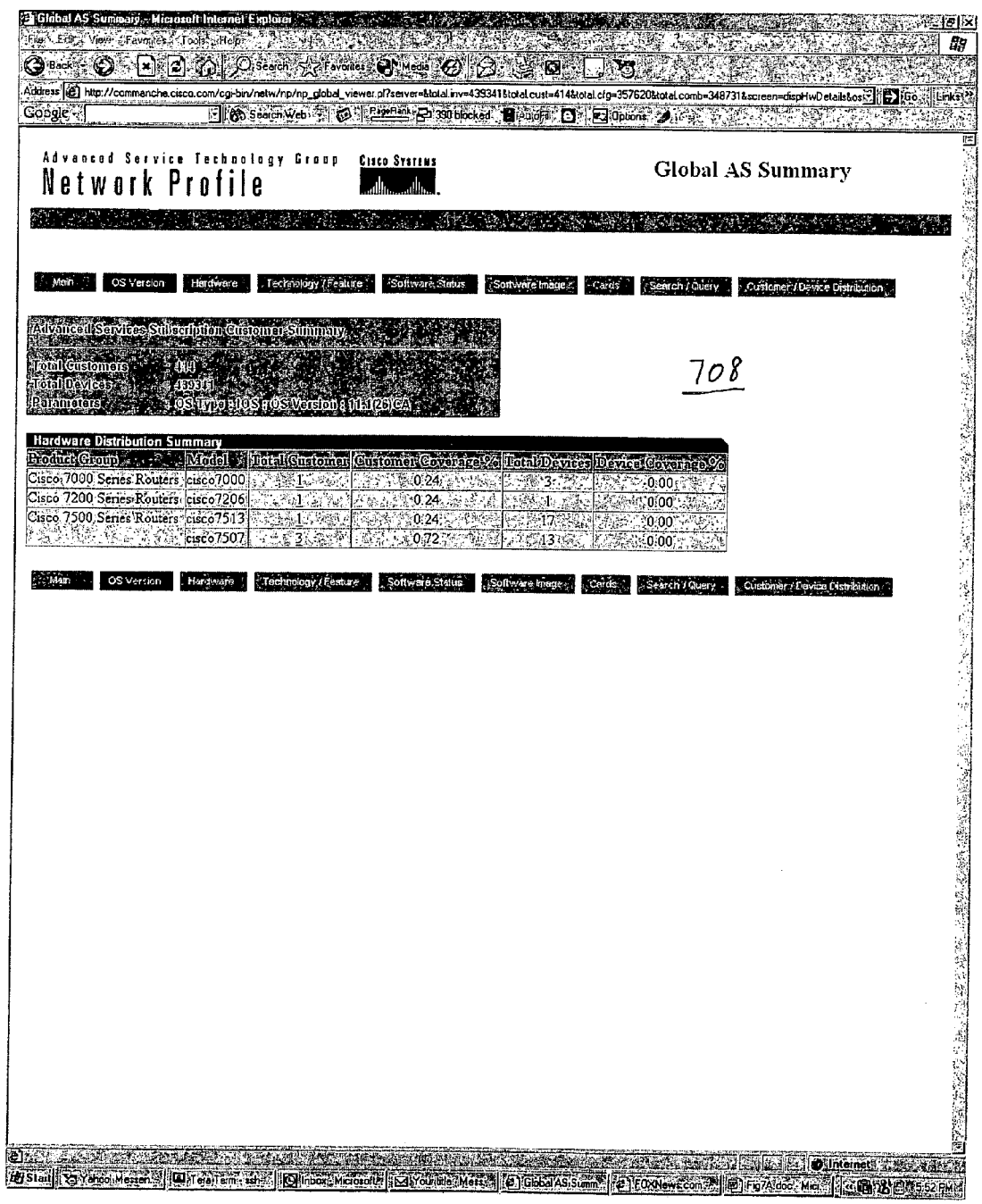
FIG. 7C is a screen display diagram showing an example hardware distribution summary.
Figure 7D:
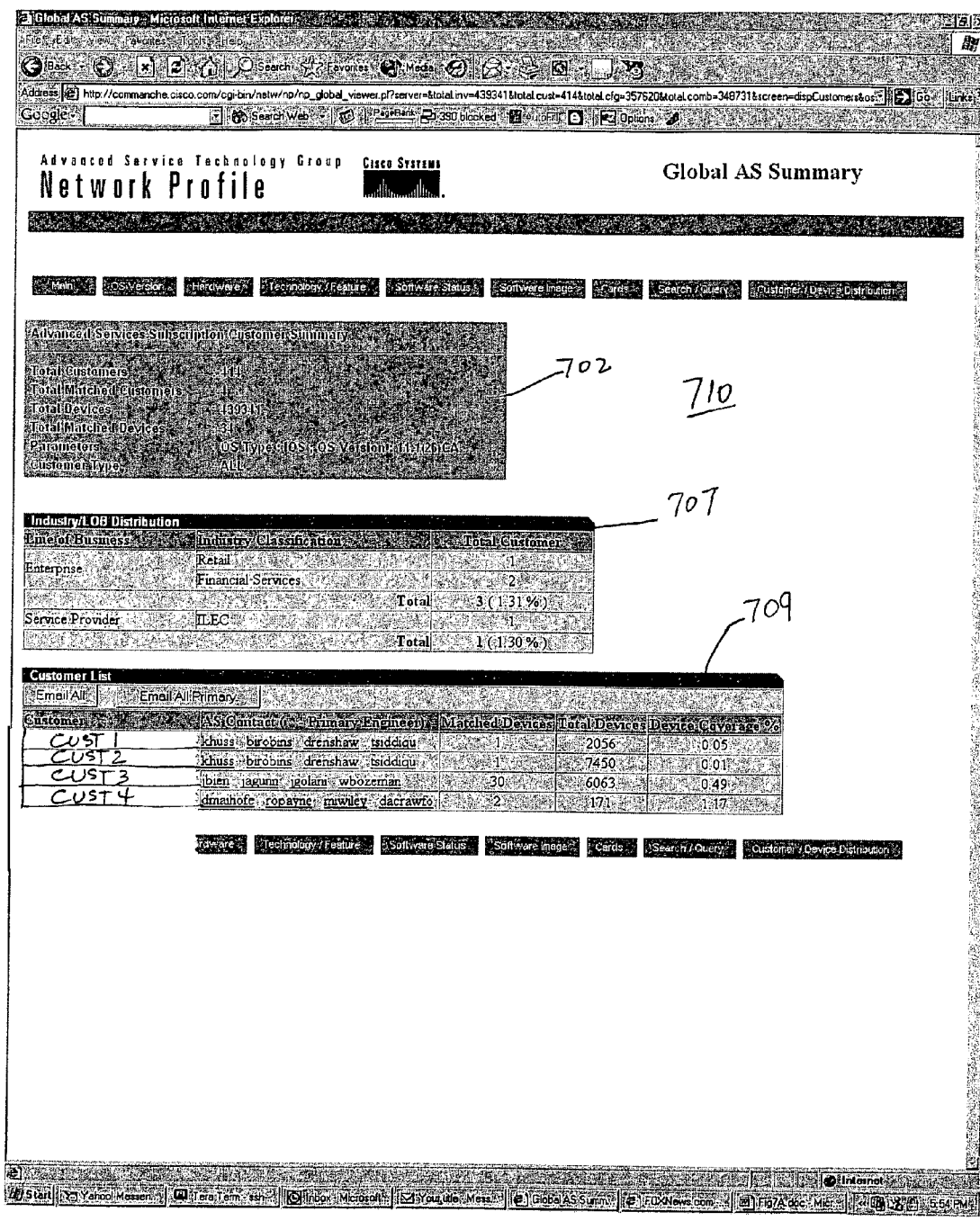
FIG. 7D is a screen display diagram showing an example customer summary.

Selecting a value in the customer count column 614 causes the system to generate and display a Customer Summary 610 that provides basic information about all customers that are using the associated software release. FIG. 7D is a screen display diagram showing an example of a customer summary 710 corresponding to summary 610. In the embodiment of FIG. 7D, a customer summary comprises a summary information area 702, an industry information area 707, and a customer list 709. The summary information area 702 specifies the total number of customers represented in the system database, the total number of customers that are "matched" or shown in the customer list 707, the total number of devices represented in the system database, the total number of "matched" devices that use the associated software release, and search query parameters indicating how the customer summary was created. The industry information area 707 specifies what lines of business or industry classifications are associated with the customers in the customer list 709. The customer list identifies customer names, vendor contact personnel, the number of matched devices, the total number of devices at that customer, and the device coverage for the matched devices.

In an embodiment, values in the operating system version column 620 are hyperlinked. Selecting a hyperlinked operating system version value causes the system to generate and display a Hardware Distribution Summary 608 comprising a table or list of information about hardware devices in customer networks that run the selected operating system version. In one embodiment, a Hardware Distribution Summary 608 has columns for hardware device product group, model identifier, customer count indicating the total number of customers, customer coverage indicating the percentage of all customers that have devices that run the selected operating system version, total devices that run the selected operating system version, and device coverage indicating a percentage of all devices that run the selected operating system version. FIG. 7C is a screen display diagram showing an example hardware distribution summary 708 corresponding to summary 608.

In an embodiment, the customer count values are hyperlinked. Selecting a particular customer count value causes the system to generate and display a Customer Summary 610 providing basic information about all vendor customers having devices that run the associated operating system version, as described above and shown in FIG. 7D.

Referring again to FIG. 6, hardware summary 605 comprises a list of hardware platforms that are deployed in one or more customer networks. In one embodiment, a hardware summary 605 comprises columns for hardware family, total customers using hardware in the associated hardware family, a customer coverage value indicating a percentage of all customers that are using hardware in the associated hardware family, a total devices column indicating total numbers of devices that are in the associated hardware family among all customers, and a device coverage column indicating a percentage of all devices of all customers that are in the associated hardware family. FIG. 7C is a screen display diagram showing an example hardware summary.

In an embodiment, values in the hardware family column 616 and total customer column 618 are hyperlinked. Selecting a particular hardware family value causes the system to generate and display a Hardware Distribution Summary 608 listing information about devices in the associated hardware family. Selecting a particular customer count value from total customer column 618 causes the system to generate and display a Customer Summary 610 as described above and shown in FIG. 7D, summarizing information about customers that use the associated hardware family.

The information described in FIG. 6 may be stored in a relational database system in which tables store information relating to devices, customers, hardware families, and software releases. Based on the tables, appropriate relational database queries can generate the total customer count values, customer coverage values, device count values, and device coverage values described herein, by summing data values and computing percentages. Based on result sets generated by such queries, the system may generate and display reports in the form of the tables shown, for example, in FIG. 7A-FIG. 7F.

Figure 8:
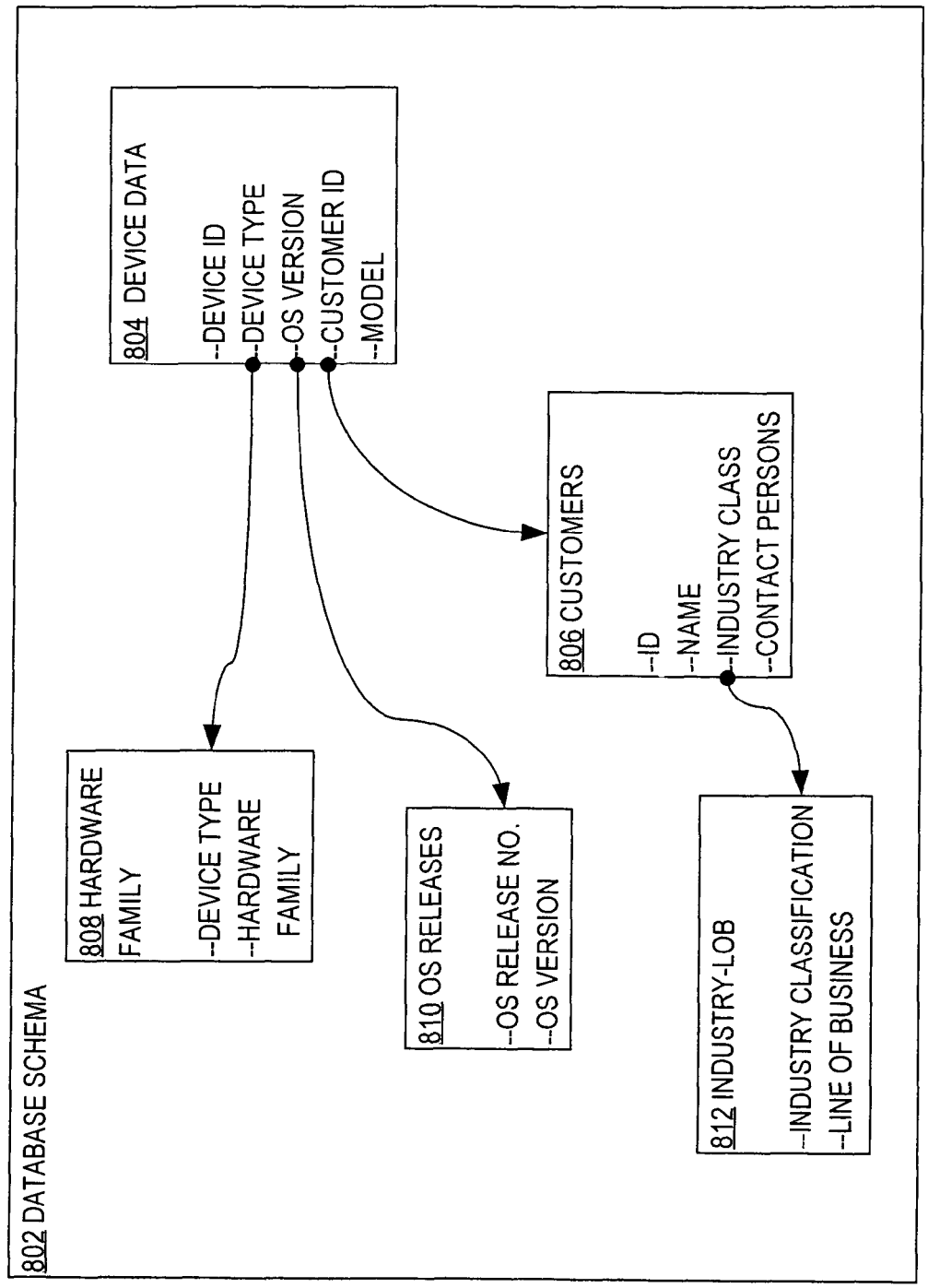
FIG. 8 is a block diagram showing an example database schema.

As an example, FIG. 8 is a block diagram of a database schema that may be used. Schema 802 comprises a device data table 804, customer table 806, hardware family table 808, operating system releases table 810, and industry-line of business table 812. Device data table 804 stores information about devices in one or more customer networks. For each device, a device identifier, device type value, software version value, customer ID, and device model number is stored. The customer ID value maps to customer table 806, which associates customer ID values with customer names, industry classifications, and contact person identifiers. In customer table 806, industry classification values map to industry-line of business table 812, which associates industry classification values to line of business values. Device type values in device data table 804 map to hardware family values in hardware family table 808. Software version values in device data table 804 map to software release number values in operating system releases table 810.

FIG. 8 shows example tables. In a practical embodiment, a database schema may include other tables. For example, if devices run several different kinds of software, then schema 802 may include tables other than operating system releases table 810 to hold details about such software.

Referring again to FIG. 5B, the hardware summary 564, a technology/feature summary 566, a software status summary 568, a device card summary 570, a customer/device distribution summary 572 may be supported using the same tables and additional tables as shown in the database schema of FIG. 8, and may be implemented in a graphical user interface using electronic reports similar in form and content to the summaries of FIG. 7A-7D, as now described with reference to FIG. 9A-FIG. 12.

Figure 9A:
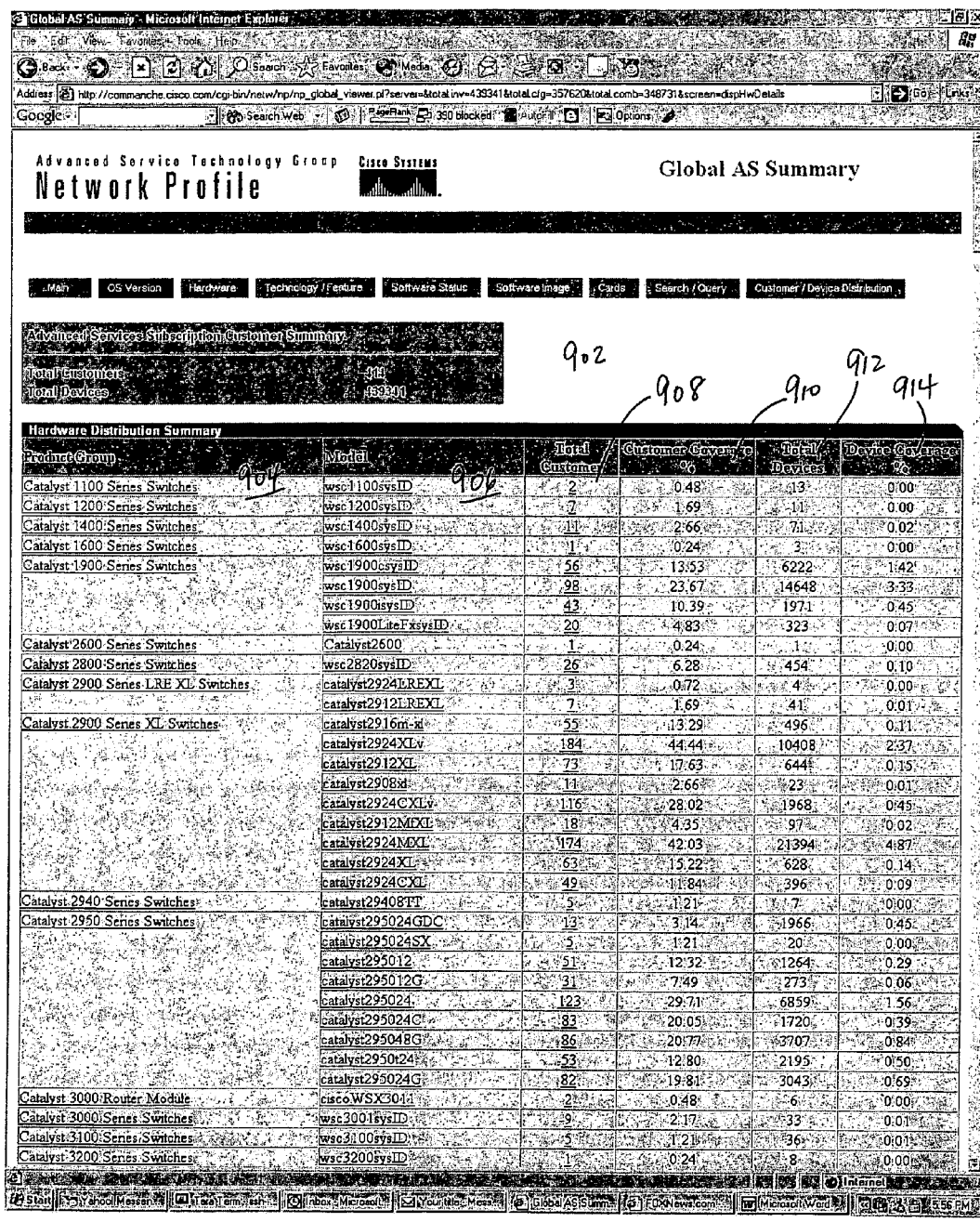
FIG. 9A is a screen display diagram showing an example hardware summary.

FIG. 9A is a screen display diagram showing an example hardware summary 902 comprising a product group column 904, model column 906, customer count column 908, customer coverage column 910, total devices column 912, and device coverage column 914. Each entry in product group column 904 is hyperlinked. Selecting a product group entry in column 904 causes network profile manager 110 to generate and display a hardware distribution summary in the form of FIG. 7C. Each entry in model column 906 is hyperlinked. Selecting a model value in model column 906 causes network profile manager 110 to generate and display a hardware distribution summary similar to the form of FIG. 7C.

FIG. 9B is a screen display diagram showing an example technology/feature summary 910 comprising a technology column 912, feature column 914, customer count column 916, customer coverage column 918, device count column 920, and device coverage column 922. Technology column 912 displays a technology or feature that is present in at least one device of any of the customer networks that are managed by profile manager 110. Feature column 914 shows specific hardware or software features, related to an associated technology in technology column 912, that are deployed in devices of the customer networks. Customer count column 916 specifies the total number of vendor customers that have the associated feature; customer coverage column 918 indicates the percentage of all vendor customers that have the associated feature; device count column 920 indicates the total number of devices that have the associated feature; and device coverage column 922 indicates a percentage of all devices that have the associated feature.

Figure 9C:
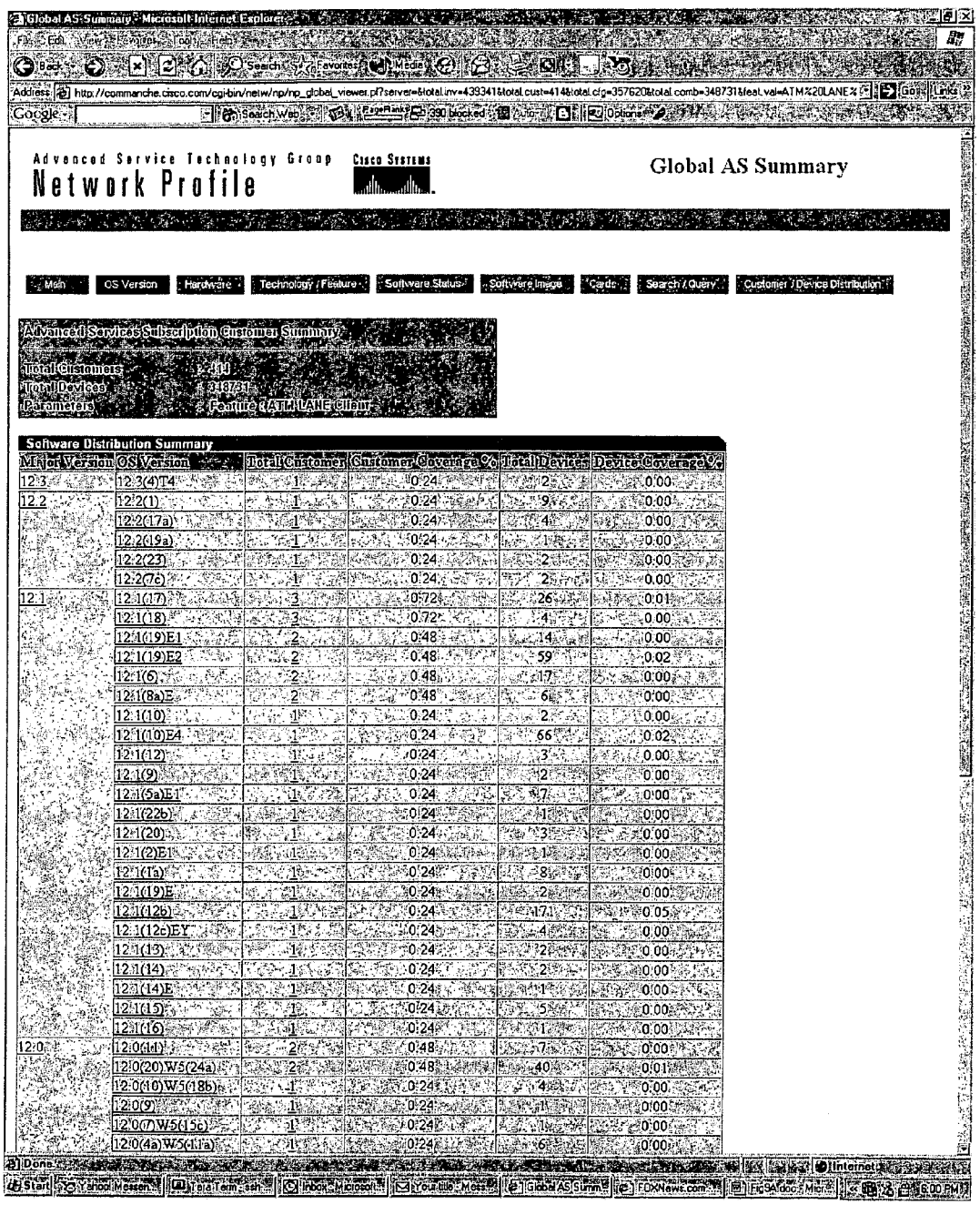
FIG. 9C is a screen display diagram showing an example software distribution summary associated with a particular feature of FIG. 9B.
Figure 9D:
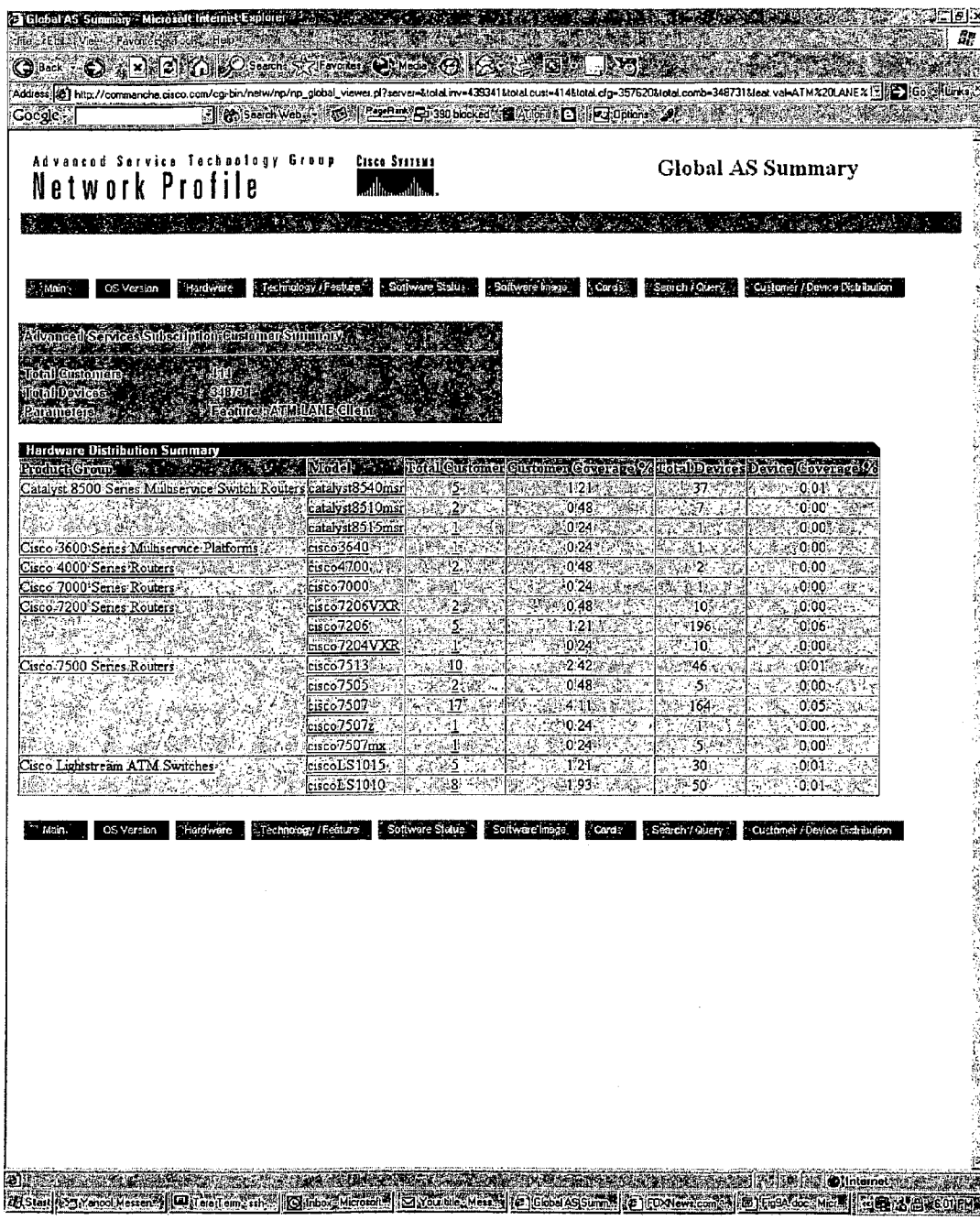
FIG. 9D is a screen display diagram showing an example hardware distribution summary associated with a particular feature of FIG. 9B.

In one embodiment, values in feature column 914 are displayed in association with icons for selecting a hardware distribution summary and a software distribution summary for the associated feature. Selecting the icons causes the profile manager 110 to display, respectively, a software distribution summary similar to that of FIG. 7B or a hardware distribution summary similar to that of FIG. 7C, as specifically shown in FIG. 9C. Further, values in customer count column 916 may be hyperlinked and, when selected, cause profile manager 110 to generate and display a customer summary similar to that of FIG. 7D, as specifically shown in FIG. 9D. FIG. 9C is a screen display diagram showing an example software distribution summary associated with the ATM Lane Client feature of FIG. 9B; FIG. 9D is a screen display diagram showing an example hardware distribution summary associated with a particular feature of FIG. 9B.

Figure 10A:
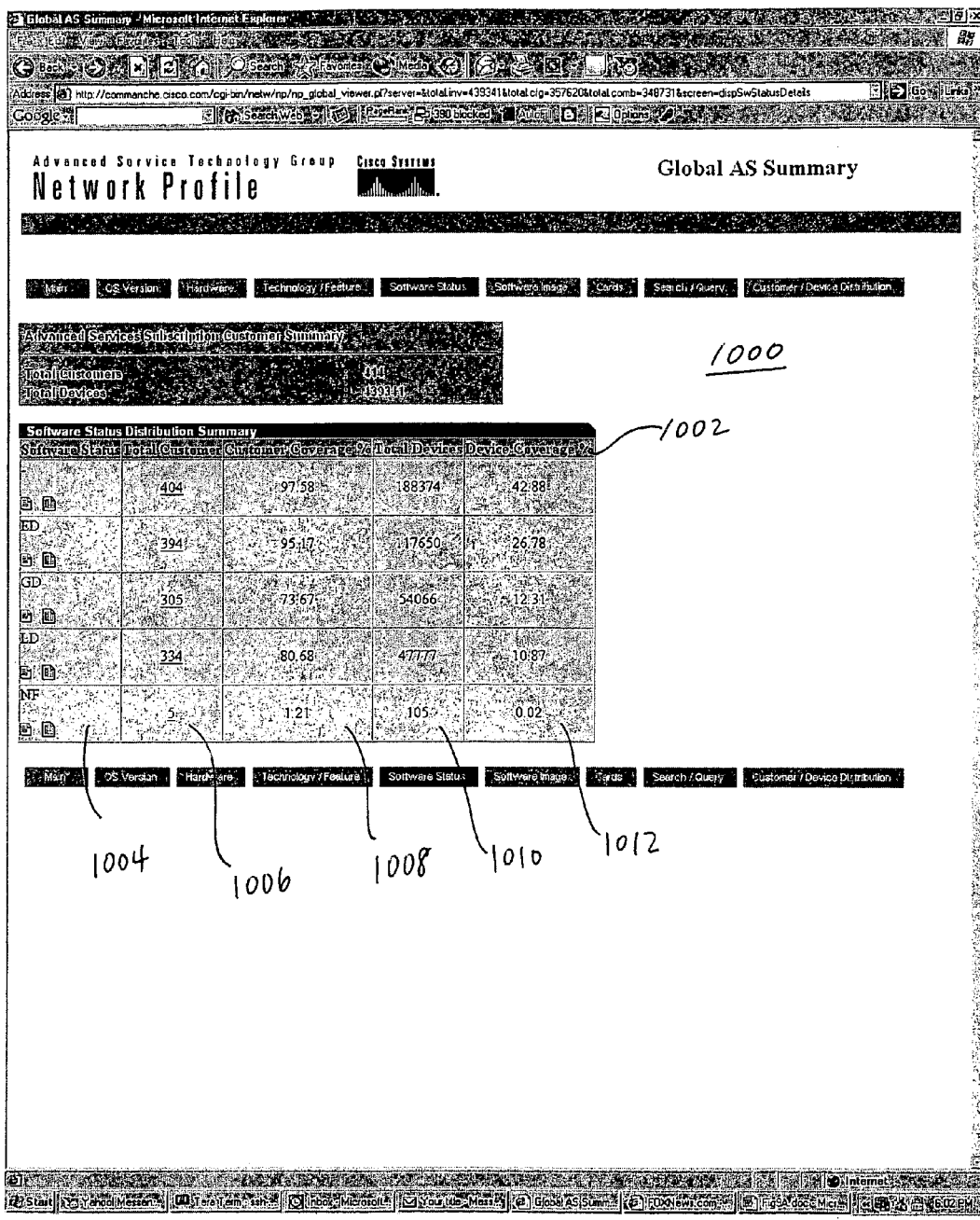
FIG. 10A is a screen display diagram showing an example software status distribution summary.

FIG. 10A is a screen display diagram showing an example software status distribution summary 1000 corresponding to a software status summary 568 of FIG. 5B. The software status distribution summary 1000 comprises a software status column 1004, customer count column 1006, customer coverage column 1008, device count column 1010, and device coverage column 1012. The software status column 1004 comprises one or more entries for different status values that may apply to software releases that are deployed to devices in the customer networks. In one embodiment, software deployed in network devices of customer networks may have status values of ED, GD, LD, NF, or null, where ED stands for Early Deployment, GD means General Deployment, LD means Limited Deployment, and NF means that a status value was not recorded. Customer count column 1006 indicates the total number of vendor customers that have at least one device with software having the associated status value. Customer coverage column 1008 specifies a percentage of total number of vendor customers that have at least one device with software having the associated status value. Device count column 1010 gives the total number of devices that run software with the associated status value. Device coverage column 1012 gives a percentage of all devices that run software with the indicated status value.

Figure 10B:
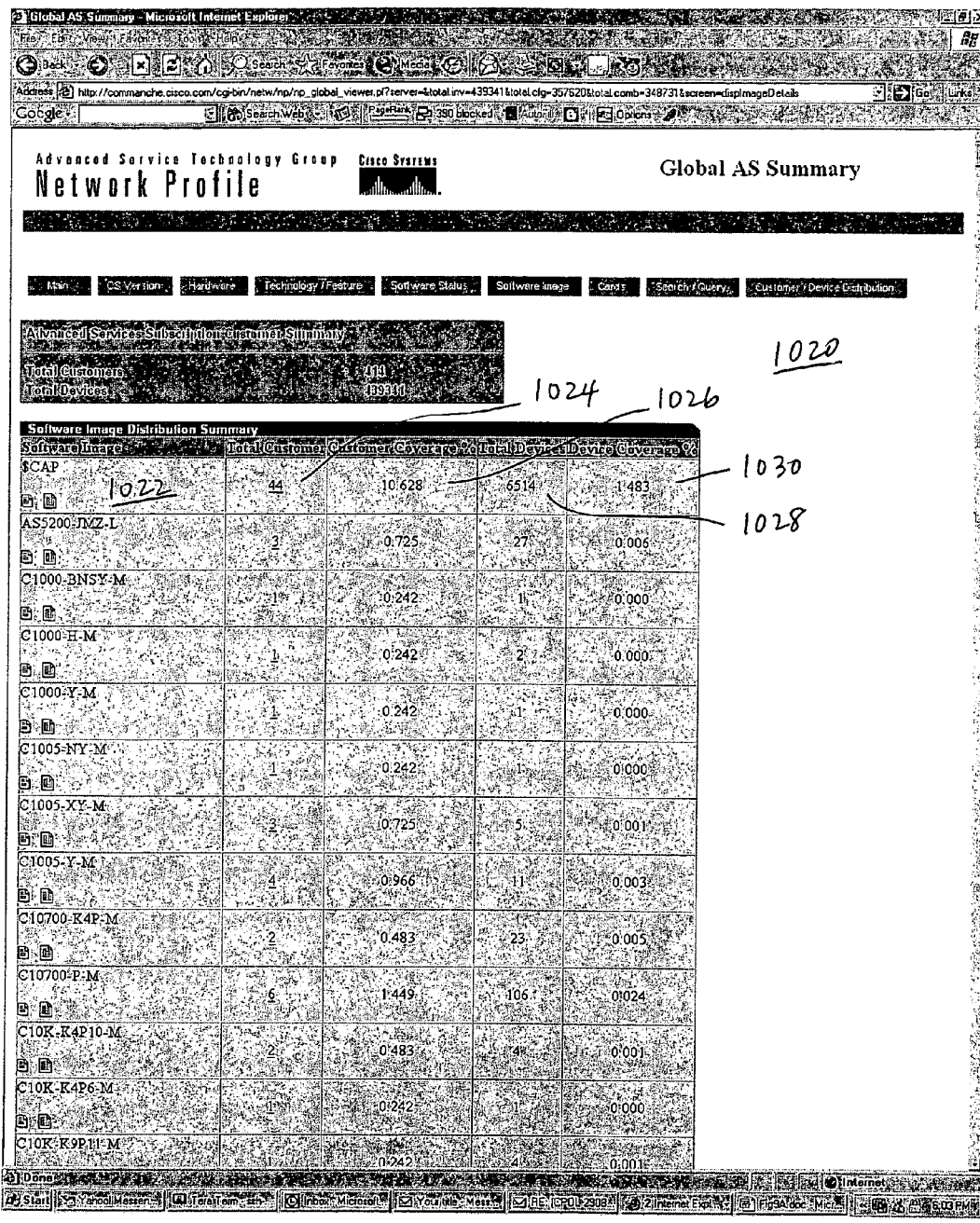
FIG. 10B is a screen display diagram showing an example software image distribution summary.

FIG. 10B is a screen display diagram showing an example software image distribution summary 1020 that may be generated for the software image summary 569 of FIG. 5B. The summary 1020 comprises a software image column 1022, customer count column 1024, customer coverage column 1026, total devices column 1028, and device coverage column 1030. The software image column 1022 lists software images, alphabetically by name, that are in use by at least one device of a customer that is managed by the network profile manager 110. The customer count column 1024 shows the number of customers that have devices that use software corresponding to the named image. The customer coverage column 1026 shows the percentage of all customers that have the associated software image. The total devices column 1028 shows the total number of network devices across all vendor customers that have the associated software image. The device coverage column 1030 shows the percentage of all devices across all vendor customer networks that have the associated software image. In one embodiment, values in the customer count column 1024 are hyperlinked, and selecting one of the values causes the network profile manager 110 to display a customer summary similar to that of FIG. 7D, for customers that have the associated software image.

Figure 10C:
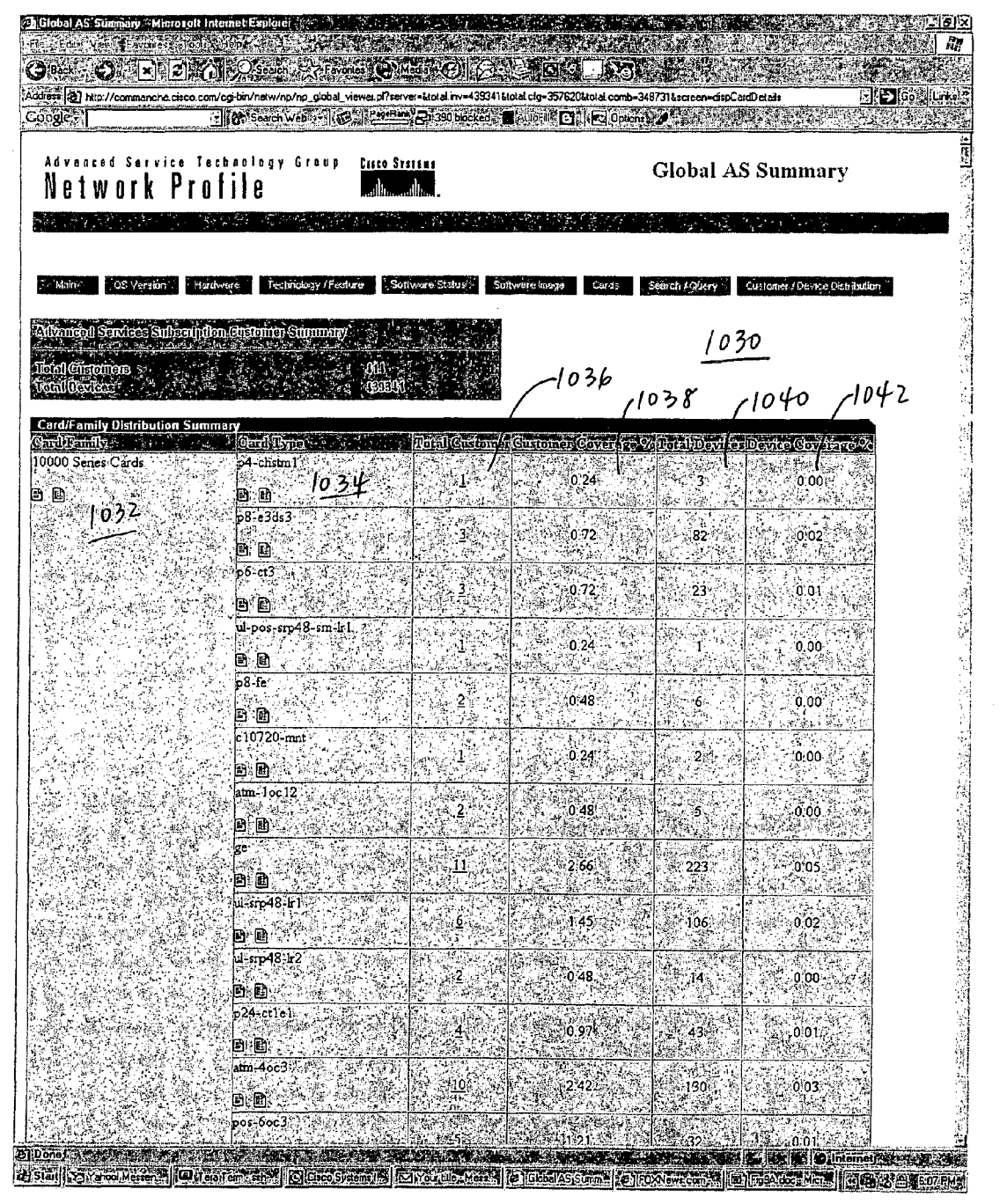

FIG. 10C is a screen display diagram showing an example card family distribution summary that may implement the device card summary 570 of FIG. 5B. In one embodiment, a card family distribution summary 1030 comprises a card family column 1032, card type column 1034, customer count column 1036, customer coverage column 1038, device count column 1040, and device coverage column 1042. Entries in the card family column 1032 identify families of line cards, route processor cards, and other circuit cards that are present in at least one device in a customer network. The card type column 1034 identifies specific card types within a card family. The customer count column 1036 indicates the total number of customers across all vendor customer networks that have a card of the corresponding card type. The customer coverage column 1038 gives the percentage of all customers that have devices with a card of the corresponding card type. The device count column 1040 indicates the total number of devices in all customer networks that have cards with the corresponding card type. The device coverage column 1042 provides the percentage of all devices in all customer networks that have cards with the corresponding card types.

Figure 11:
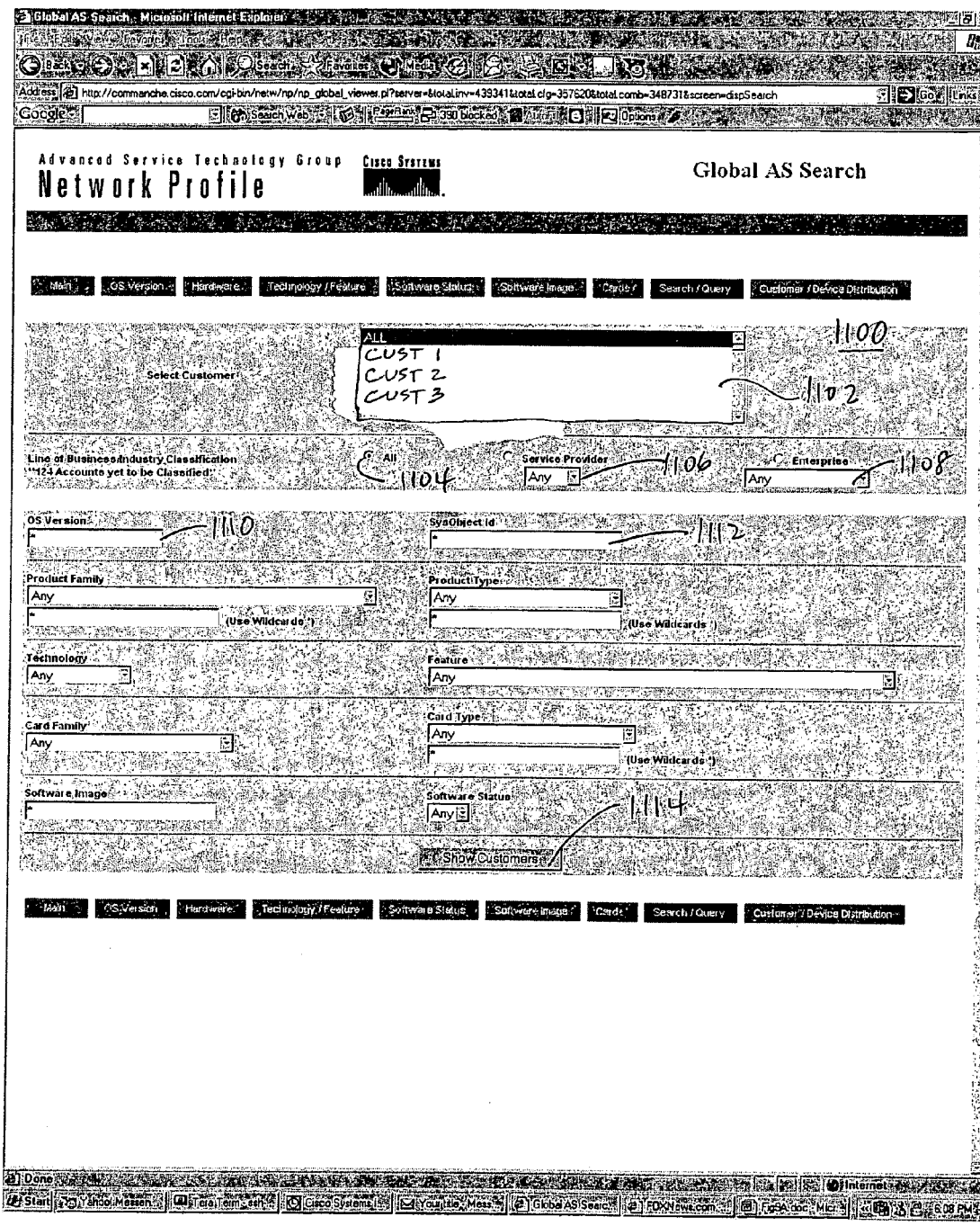
FIG. 11 is a screen display diagram showing an example search interface.

In one embodiment, the database accessed by profile manager 110 is accessible using a generalized search interface. FIG. 11 is a screen display diagram showing an example search interface 1100. Generally, a user may cause profile manager 110 to generate a customer summary based on data in the database by specifying search criteria using one or more user interface widgets 1102-1112 and selecting a Show Customers button 1114. In response, profile manager 110 performs a search of the database according to the specified criteria, and generates and displays a customer summary for any records in the database that match the search criteria. In one embodiment, the user interface widgets may comprise a customer combo box 1102 for selecting customers by name, line of business radio buttons and combo boxes 1104, 1106, 1108 for selecting a particular industry classification or customer line of business, an operating system version text box 1110, a sysObjectID text box 1112, etc. The particular fields that are exposed in the search interface 1100 are not critical, but may comprise all principal fields that are represented in the database.

Figure 12:
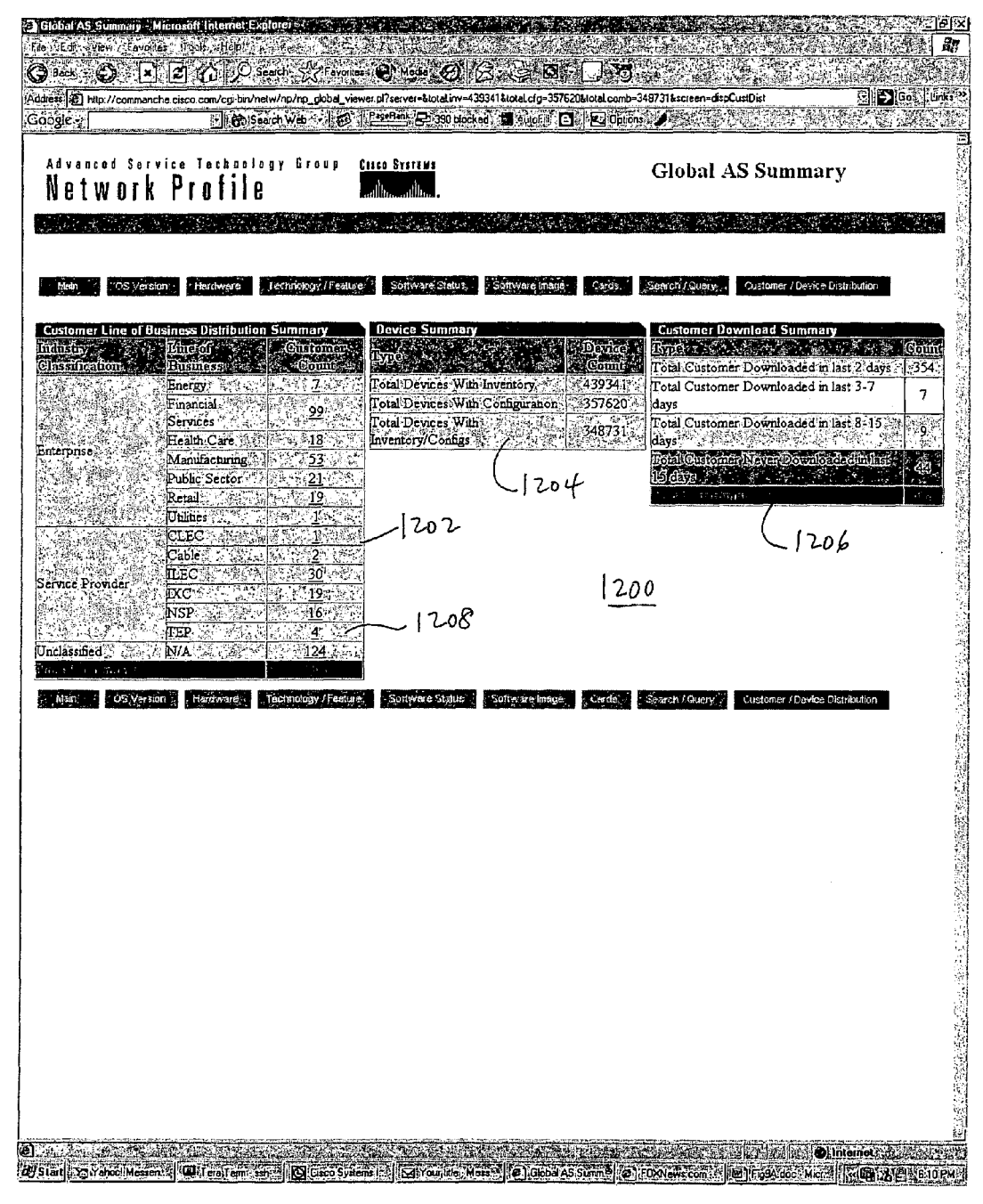

FIG. 12 is a screen display diagram showing an example customer/device distribution summary that may be generated corresponding to a customer/device distribution summary 572 of FIG. 5B. In one embodiment, a customer/device distribution summary 1200 comprises a customer line of business distribution summary 1202, a device summary 1204, and a customer download summary 1206. The customer line of business distribution summary 1202 shows the total number of customers for each industry classification and line of business that have customers in the database. The device summary 1204 shows a count of the total number of devices of specified types, such as devices with inventory, with configuration, etc. The customer download summary 1206 shows the number of software downloads that customers have performed in selected time periods. Values for the customer/device distribution summary may be computed based on data in the database using summation queries or other techniques.

In all cases in which this disclosure refers to generating and displaying information, forms of output other than displaying may be substituted. For example, the information and summaries described herein may be provided to other applications using any appropriate messaging technique, such as an event bus, API, or other inter-program communication mechanism. Further, output in the form of a file, spreadsheet, printed document, or other output medium may be substituted.

The approaches disclosed herein provide numerous benefits with respect to prior practice. Fundamentally, a network vendor that uses the approaches herein can provide scalable proactive or reactive network support for a customer network. The disclosed approaches enable a network administrator to determine the types and versions of network hardware and software that are being used at any particular moment. This information supports root cause analysis for network outages, and enables the customer to verify that it is entitled to receive particular support services, upgrades or other benefits from the vendor. When integrated with a network management system as shown, for example, in FIG. 5, the approaches herein can augment automatic monitoring of upgrades and changes in a network. Further, given a defect notification from a vendor, a customer can rapidly and automatically identify the affected network hardware and software.

3.0 Implementation Mechanisms—Hardware Overview

Figure 13:
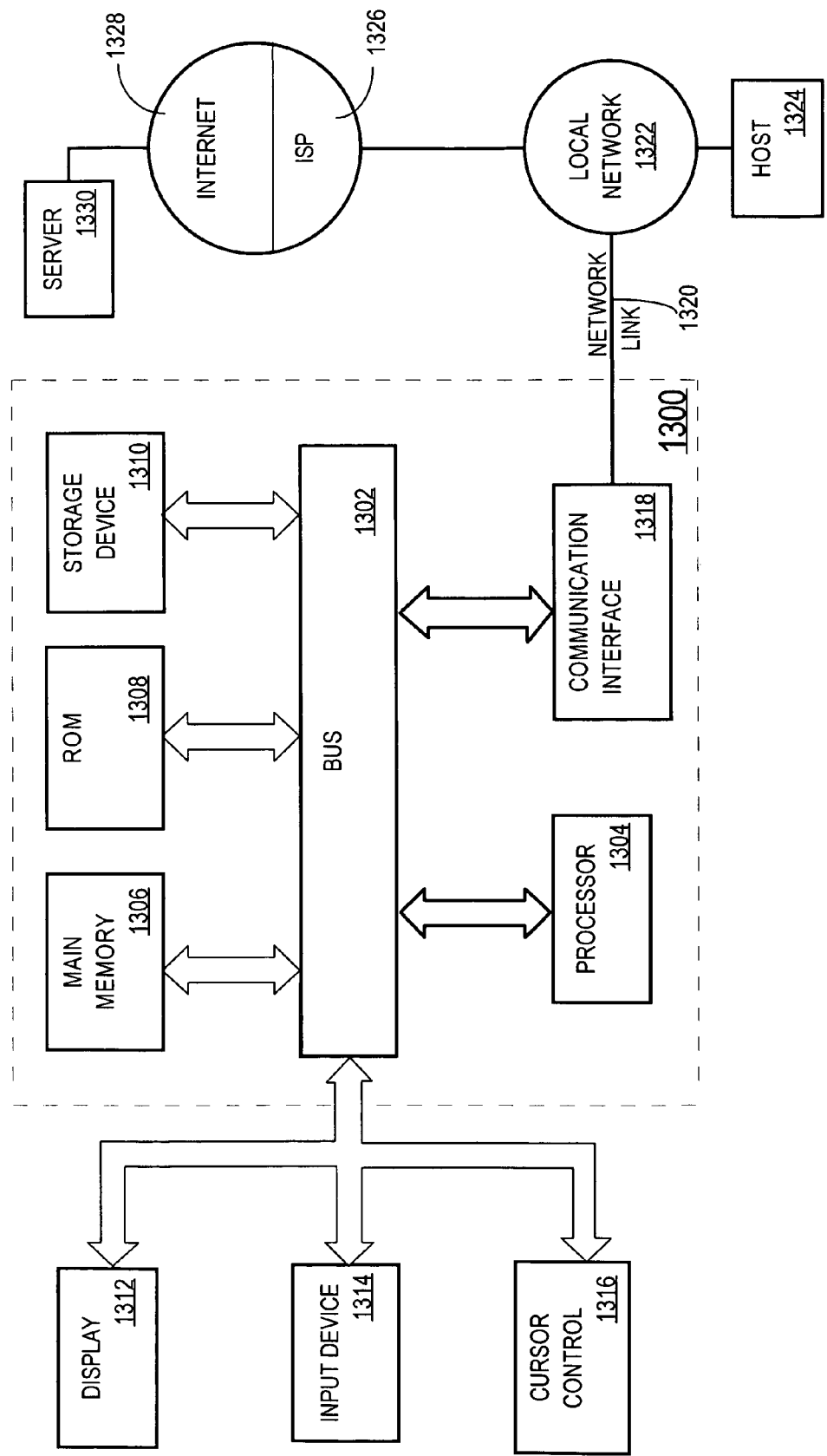
FIG. 13 is a block diagram that illustrates a computer system upon which an embodiment may be implemented.

FIG. 13 is a block diagram that illustrates a computer system 1300 upon which an embodiment of the invention may be implemented. Computer system 1300 includes a bus 1302 or other communication mechanism for communicating information, and a processor 1304 coupled with bus 1302 for processing information. Computer system 1300 also includes a main memory 1306, such as a random access memory ("RAM") or other dynamic storage device, coupled to bus 1302 for storing information and instructions to be executed by processor 1304. Main memory 1306 also may be used for storing temporary variables or other intermediate information during execution of instructions to be executed by processor 1304. Computer system 1300 further includes a read only memory ("ROM") 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a cathode ray tube ("CRT"), for displaying information to a computer user. An input device 1314, including alphanumeric and other keys, is coupled to bus 1302 for communicating information and command selections to processor 1304. Another type of user input device is cursor control 1316, such as a mouse, trackball, stylus, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

The invention is related to the use of computer system 1300 for generating a network profile and device profile. According to one embodiment of the invention, generating a network profile and device profile is provided by computer system 1300 in response to processor 1304 executing one or more sequences of one or more instructions contained in main memory 1306. Such instructions may be read into main memory 1306 from another computer-readable medium, such as storage device 1310. Execution of the sequences of instructions contained in main memory 1306 causes processor 1304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1304 for execution. Such a medium may take many forms, including but not limited to, non-volatile media, volatile media, and transmission media. Non-volatile media includes, for example, optical or magnetic disks, such as storage device 1310. Volatile media includes dynamic memory, such as main memory 1306. Transmission media includes coaxial cables, copper wire and fiber optics, including the wires that comprise bus 1302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1304 for execution. For example, the instructions may initially be carried on a magnetic disk of a remote computer. The remote computer can load the instructions into its dynamic memory and send the instructions over a telephone line using a modem. A modem local to computer system 1300 can receive the data on the telephone line and use an infrared transmitter to convert the data to an infrared signal. An infrared detector can receive the data carried in the infrared signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network ("ISDN") card or a modem to provide a data communication connection to a corresponding type of telephone line. As another example, communication interface 1318 may be a local area network ("LAN") card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider ("ISP") 1326. ISP 1326 in turn provides data communication services through the worldwide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are exemplary forms of carrier waves transporting the information.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318. In accordance with the invention, one such downloaded application provides for generating a network profile and device profile as described herein.

The received code may be executed by processor 1304 as it is received, and/or stored in storage device 1310, or other non-volatile storage for later execution. In this manner, computer system 1300 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising the computer-implemented steps of:

a computer receiving device identity information for a plurality of devices in one or more customer networks;

the computer receiving device configuration information from each of the devices in the networks;

the computer determining one or more technology names of technologies represented in the configuration of the plurality of devices based on reading and parsing the device configuration information through applying pattern-matching rules to a set of configuration commands that are in the configuration information;

the computer transforming the device configuration information into device feature information;

the computer creating and storing, based on the device identity information, device configuration information, and device feature information, a device profile that summarizes device details for all the devices;

the computer creating and storing, based on the device identity information, device configuration information, the one or more technology names, and device feature information, a topology profile that summarizes the networking devices and technologies that are in use in the network, wherein the device profile includes summary information for each of a plurality of device details including interfaces, cards, and one or more neighboring nodes, wherein the transforming includes applying one or more feature rules to the device configuration information.

2. A method as recited in claim 1, further comprising the steps of:

receiving a sysObjID MIB variable value from each of the devices;

mapping the MIB variable value to a device type value;

mapping the device type value to one or more device characteristic values.

3. A method as recited in claim 2, wherein mapping the device type value is performed based on one or more device characteristic rules.

4. A method as recited in claim 1, further comprising grouping each of the one or more device features into one or more technology types as part of the device profile.

5. A method as recited in claim 1, wherein creating and storing the topology profile comprises:

generating an in-memory model of a Layer 3 topology of the network; and based on the in-memory model, creating and storing topology summary information for each of a plurality of network topology attributes.

6. A method as recited in claim 1, further comprising providing the device profile to a requesting process through an API.

7. A method as recited in claim 1, wherein the network profile comprises a software summary for all software releases that are run by devices in the customer networks and a hardware summary of all hardware families associated with devices in the customer networks.

8. A method as recited in claim 7, wherein the software summary comprises one or more release number values, wherein selecting a particular release number value causes generating a software distribution summary comprising a customer count, customer coverage percentage, device count, and device coverage percentage for all software versions that are associated with a selected release number value.

9. A method as recited in claim 7, wherein the software summary comprises one or more customer count values and release number values, wherein selecting a particular customer count value causes generating a customer summary that lists and summarizes customer information about one or more entities that use the particular release number.

10. A method as recited in claim 8, wherein the software distribution summary comprises one or more customer count values and software version number values, wherein selecting a particular customer count value causes generating a customer summary that lists and summarizes customer information about one or more entities that use a software version of a particular software version number that is associated with the selected particular customer count value.

11. A method as recited in claim 7, wherein the device profile comprises summary information identifying device chassis type, device software version, cards, interface types, interface names, memory type, technology types, and feature types.

12. A method as recited in claim 1, further comprising generating and displaying a hardware distribution summary that lists product groups and model identifiers, and identifies a customer count, customer coverage, device count, and device coverage for all devices in the customer networks that have the listed model identifiers.

13. A method as recited in claim 1, further comprising generating and displaying a technology feature summary that lists information about networking technologies and device features associated with the networking technologies, and identifies a customer count, customer coverage, device count, and device coverage for all devices in the customer networks that have the listed device features.

14. A method as recited in claim 1, further comprising generating and displaying a software distribution summary that lists software versions used by devices in the customer networks, and identifies a customer count, customer coverage, device count, and device coverage for all devices in the customer networks that have the listed software versions.

15. A method as recited in claim 1, further comprising generating and displaying a software status summary that lists software status values associated with software programs that are used by devices in the customer networks, and identifies a customer count, customer coverage, device count, and device coverage for all devices in the customer networks that have software programs with the listed software status values.

16. A method as recited in claim 1, further comprising generating and displaying a software image distribution summary that lists software image values associated with software images that are used by devices in the customer networks, and identifies a customer count, customer coverage, device count, and device coverage for all devices in the customer networks that have software programs with the listed software image values.

17. A method as recited in claim 1, further comprising generating and displaying a card distribution summary that lists card values associated with electronic circuit cards that are used by devices in the customer networks, and identifies a customer count, customer coverage, device count, and device coverage for all devices in the customer networks that have software programs with the listed electronic circuit cards.

18. A non-transitory computer-readable volatile or non-volatile storage medium carrying one or more sequences of instructions for generating a network profile and a device profile relating to devices in one or more networks, which instructions, when executed by one or more processors, cause the one or more processors to carry out the steps of:

receiving device identity information for a plurality of devices in one or more customer networks;

receiving device configuration information from each of the devices in the networks;

determining one or more technology names of technologies represented in the configuration of the plurality of the devices based on reading and parsing the device configuration information through applying pattern-matching rules to a set of configuration commands that are in the configuration information;
transforming the device configuration information into device feature information;
creating and storing, based on the device identity information, device configuration information, and device feature information, a device profile that summarizes device details for all the devices;
creating and storing, based on the device identity information, device configuration information, the one or more technology names, and device feature information, a topology profile that summarizes the networking devices and technologies that are in use in the network,
wherein the device profile includes summary information for each of a plurality of device details including interfaces, cards, and one or more neighboring nodes.

19. A non-transitory computer-readable volatile or non-volatile storage medium as recited in claim 18, wherein the network profile comprises a software summary for all software releases that are run by devices in the customer networks and a hardware summary of all hardware families associated with devices in the customer networks.

20. A non-transitory computer-readable volatile or non-volatile storage medium as recited in claim 19, wherein the software summary comprises one or more release number values, wherein the instructions that cause the one or more processors to carry out the step of selecting a particular release number value causes generating a software distribution summary comprising a customer count, customer coverage percentage, device count, and device coverage percentage for all software versions that are associated with a selected release number value.

21. A non-transitory computer-readable volatile or non-volatile storage medium as recited in claim 18, further comprising instructions that cause the one or more processors to carry out the step of generating and displaying a technology feature summary that lists information about networking technologies and device features associated with the networking technologies, and identifies a customer count, customer coverage, device count, and device coverage for all devices in the customer networks that have the listed device features.

22. A non-transitory computer-readable volatile or non-volatile storage medium as recited in claim 18, further comprising instructions that cause the one or more processors to carry out the step of generating and displaying a software distribution summary that lists software versions used by devices in the customer networks, and identifies a customer count, customer coverage, device count, and device coverage for all devices in the customer networks that have the listed software versions.

23. An apparatus for generating a network profile and a device profile relating to devices in one or more networks, comprising:
a network interface that is coupled to the data network for receiving one or more packet flows therefrom;
a processor;
a memory storing sequences of instructions which, when executed by the processor, cause the processor to carry out the steps of:
receiving device identity information for a plurality of devices in one or more customer networks;
receiving device configuration information from each of the devices in the networks;
determining one or more technology names of technologies represented in the configuration of the plurality of devices based on reading and parsing the device configuration information through applying pattern-matching rules to a set of configuration commands that are in the configuration information;
transforming the device configuration information into device feature information;
creating and storing, based on the device identity information, device configuration information, and device feature information, a device profile that summarizes device details for all the devices;
creating and storing, based on the device identity information, device configuration information, the one or more technology names, and device feature information, a topology profile that summarizes the networking devices and technologies that are in use in the network,
wherein the device profile includes summary information for each of a plurality of device details including interfaces, cards, and one or more neighboring nodes,
wherein the transforming includes applying one or more feature rules to the device configuration information.

24. An apparatus as recited in claim 23, wherein the network profile comprises a software summary for all software releases that are run by devices in the customer networks and a hardware summary of all hardware families associated with devices in the customer networks.

25. An apparatus as recited in claim 24, wherein the software summary comprises one or more release number values, wherein the instructions that cause the processor to carry out the step of selecting a particular release number value causes generating a software distribution summary comprising a customer count, customer coverage percentage, device count, and device coverage percentage for all software versions that are associated with a selected release number value.

26. An apparatus as recited in claim 23, wherein the memory further stores instructions that cause the processor to carry out the step of generating and displaying a technology feature summary that lists information about networking technologies and device features associated with the networking technologies, and identifies a customer count, customer coverage, device count, and device coverage for all devices in the customer networks that have the listed device features.

27. An apparatus as recited in claim 23, wherein the memory further stores instructions that cause the one or more processors to carry out the step of generating and displaying a software distribution summary that lists software versions used by devices in the customer networks, and identifies a customer count, customer coverage, device count, and device coverage for all devices in the customer networks that have the listed software versions.

* * * * *